(12) United States Patent
Shah

(10) Patent No.: US 12,164,833 B2
(45) Date of Patent: Dec. 10, 2024

(54) AUDIO INJECTION IN REMOTE DEVICE INFRASTRUCTURE

(71) Applicant: BrowserStack Limited, Dublin (IE)

(72) Inventor: Harshit Biren Shah, Mumbai (IN)

(73) Assignee: BrowserStack Limited, Dublin (IE)

( * ) Notice: Subject to any disclaimer, the term of this patent is extended or adjusted under 35 U.S.C. 154(b) by 0 days.

(21) Appl. No.: 18/368,458

(22) Filed: Sep. 14, 2023

(65) Prior Publication Data
US 2024/0192914 A1 Jun. 13, 2024

Related U.S. Application Data

(63) Continuation of application No. 18/078,406, filed on Dec. 9, 2022, now Pat. No. 11,868,677.

(51) Int. Cl.
G06F 3/16 (2006.01)
G06F 9/451 (2018.01)
H04L 67/125 (2022.01)

(52) U.S. Cl.
CPC .............. *G06F 3/165* (2013.01); *G06F 9/451* (2018.02); *H04L 67/125* (2013.01)

(58) Field of Classification Search
CPC ......... G06F 3/165; G06F 9/451; H04L 67/125
See application file for complete search history.

(56) References Cited

U.S. PATENT DOCUMENTS

| | | | |
|---|---|---|---|
| 8,881,111 B1 | 11/2014 | Smith et al. | |
| 10,063,452 B1 | 8/2018 | Dzierwinski et al. | |
| 10,747,656 B2 * | 8/2020 | Yang | G06F 11/3664 |
| 11,080,177 B1 | 8/2021 | Schaude | |
| 11,249,821 B1 | 2/2022 | Shah et al. | |
| 11,489,845 B1 | 11/2022 | Feng et al. | |
| 11,579,595 B2 | 2/2023 | Chauvet et al. | |
| 11,606,390 B1 | 3/2023 | Grammel et al. | |
| 2008/0139195 A1 * | 6/2008 | Marsyla | G06F 3/0488 455/423 |
| 2015/0074659 A1 | 3/2015 | Madsen et al. | |
| 2018/0109434 A1 | 4/2018 | Venkiteswaran et al. | |

(Continued)

FOREIGN PATENT DOCUMENTS

| | | |
|---|---|---|
| CN | 112799891 A | 5/2023 |
| WO | 2007061241 A1 | 5/2007 |
| WO | 2010127365 A1 | 11/2010 |

*Primary Examiner* — Joseph Saunders, Jr.
(74) *Attorney, Agent, or Firm* — Cognition IP, P.C.; Edward Steakley; Saleh Kaihani

(57) ABSTRACT

A remote test infrastructure can enable a developer to use a local browser to run and test an application on a remote device. The remote device is coupled to a host machine and connected via a communication network to the browser. The infrastructure can stream a video feed of the display of the remote device to the browser, enabling the developer to examine the result of testing and development of the application running on the remote device. For applications that have features requiring audio input, the infrastructure can pair an external component, such as the host machine, as a virtual audio input device, mimicking an external microphone. The virtual audio input device can capture an audio file or an audio stream and provide the audio as input to the application running on the remote device thereby simulating the application receiving an input from an external microphone.

20 Claims, 12 Drawing Sheets

(56) References Cited

U.S. PATENT DOCUMENTS

| | | |
|---|---|---|
| 2020/0106699 A1 | 4/2020 | Chauhan |
| 2020/0153928 A1 | 5/2020 | Chauhan et al. |
| 2022/0070151 A1 | 3/2022 | Chauhan et al. |
| 2022/0345311 A1 | 10/2022 | Momchilov et al. |
| 2023/0195491 A1 | 6/2023 | Tu et al. |

\* cited by examiner

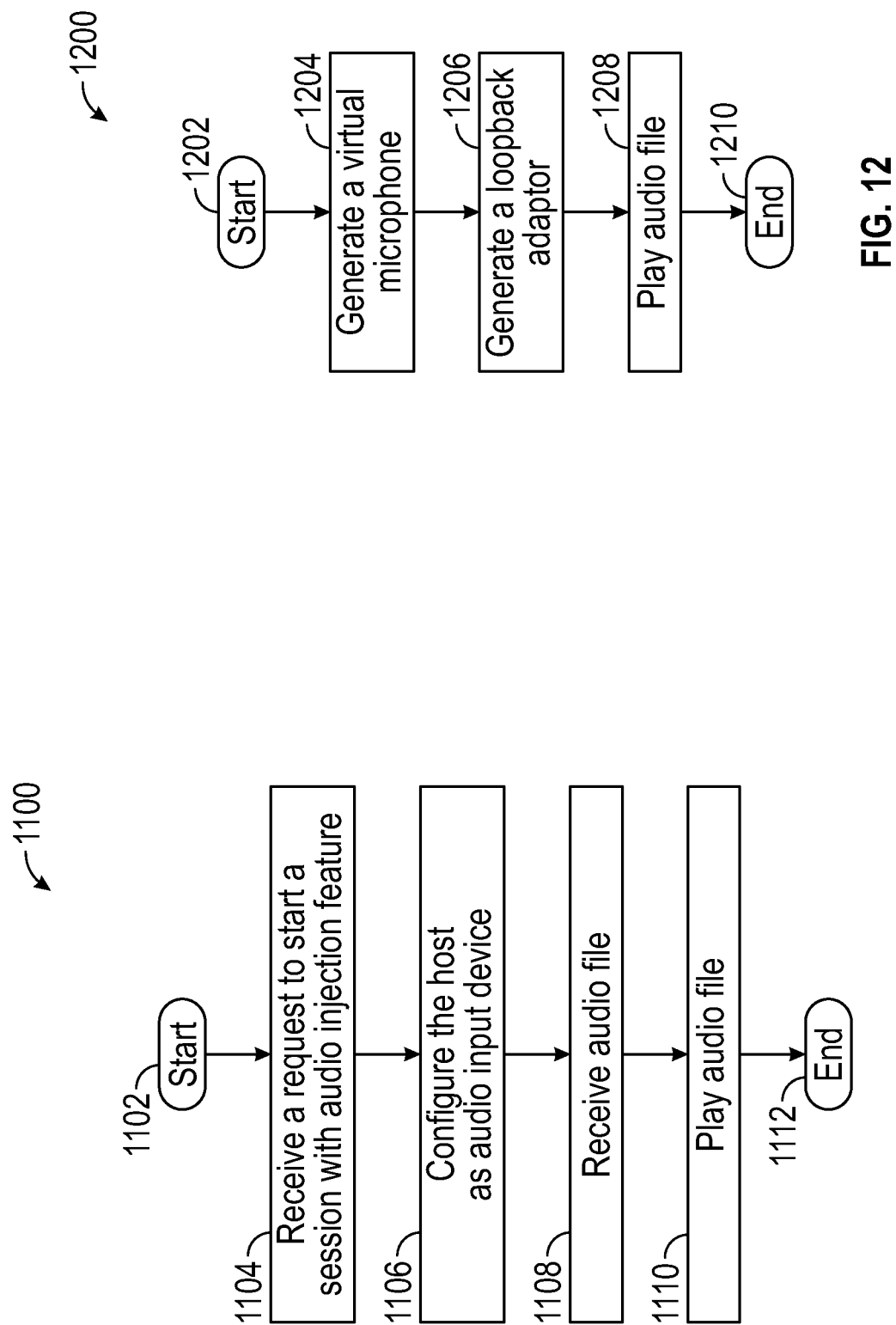

AUDIO INJECTION IN REMOTE DEVICE INFRASTRUCTURE

CROSS-REFERENCE TO RELATED APPLICATIONS

This application is a continuation of U.S. patent application Ser. No. 18/078,406, filed on Dec. 9, 2022, titled "AUDIO INJECTION IN REMOTE DEVICE INFRASTRUCTURE," which is hereby incorporated in its entirety and should be considered a part of this disclosure.

BACKGROUND

Field

This invention relates generally to the field of enabling a remote device test and development infrastructure for multiple remote hardware and software platforms, and more particularly to testing audio features of software using the infrastructure.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The multitude of computers, mobile devices and platforms have given businesses and consumers a vast array of options when they choose a device. The plethora of choices include both hardware and software. Naturally, software, application and website developers have a keen interest in ensuring their products work seamlessly across the existing hardware and platforms, including older devices on the market. This creates a challenge for the developers to properly test their products on the potential devices and platforms that their target consumer might use. On the one hand, acquiring and configuring multiple potential target devices can strain the resources of a developer. On the other hand, the developer may not want to risk losing a potential market segment by disregarding a particular platform in his typical development cycle. Even for prominent platforms, such as iOS® and Android®, at any given time, there are multiple generations and iterations of these devices on the market, further complicating the development and testing process across multiple platforms. Even in a given platform, a variety of software, operating systems and browser applications are used by a potential target audience of a developer. This dynamic illustrates a need for a robust infrastructure that enables developers to test their products across multiple devices and platforms, without having to purchase or configure multiple devices and platforms.

SUMMARY

The appended claims may serve as a summary of this application.

BRIEF DESCRIPTION OF THE DRAWINGS

These drawings and the associated description herein are provided to illustrate specific embodiments of the invention and are not intended to be limiting.

FIG. 11 illustrate a flowchart of a method of enabling the embodiment of FIG. 1 with an audio injection feature.

FIG. 12 illustrates a flowchart of a method of configuring a host machine as an audio input device and playing an audio file when an audio injection feature of the embodiment of FIG. 1 is used.

DETAILED DESCRIPTION

Figure 1:
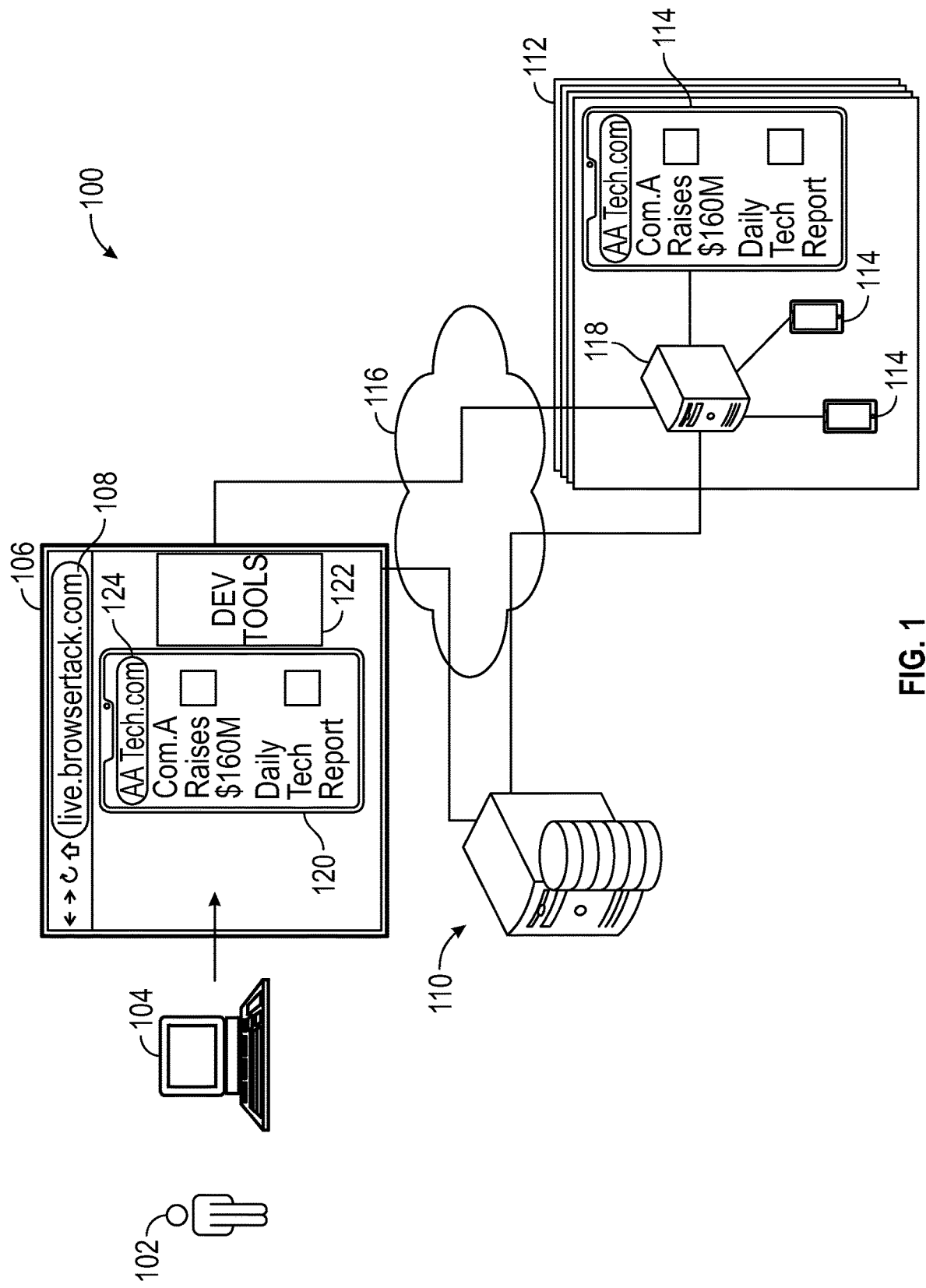
FIG. 1 illustrates an example remote test system.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Software developers, particularly website, web application and mobile device application developers have a desire to manually test their products on a multitude of hardware and software platforms that their target audience may use. A variety of mobile device manufacturers provide the hardware consumers and businesses use. Examples include, devices manufactured by Apple Inc., Google LLC, Samsung Electronics Co. Ltd., Huawei Technologies Co. Ltd. and others. Similarly, a variety of operating systems for consumer electronic devices exist. Examples include Apple iOS®, Android® operating system (OS), and WindowsR Mobile, Windows® Phone and others. Furthermore, users have a variety of choices as far as the web browser application they can use. Examples include Safari®, Chrome®, FireFox®, Windows Explorer®, and others. This variety of choice presents a difficult challenge for a web/app developer to test products on potential target devices. Traditionally, the developer might have to acquire a test device and spend resources configuring it (for example, by installing a target OS, browser, etc.) as well as a secondary hardware device to connect the test device through the secondary hardware device to a local machine of the developer, in order to write code and conduct tests on the test device. The sheer variety of possible devices, operating systems, browsers and combinations of them are numerous and can present a logistical hurdle to the developer.

A testing provider can enable a remote test system (RTS), having a multitude of devices for a developer to connect to and conduct tests. The developer can connect to the test system, select a test device, select a configuration (e.g., a particular browser, etc.) and run tests using the selected remote device. The RTS can include a server powering a website or a desktop application, which the developer can use to launch a dashboard for connecting to the RTS and for conducting tests. The dashboard can include a display of the remote device presented to the developer. The RTS system can capture developer inputs and input them to the remote device. The RTS mirrors the display of the remote device on the developer's local machine and simultaneously captures the developer's interactions inputted onto the mirrored display and transfers those commands to the remote device. In a typical case, the developer can use a keyboard and mouse to input interactions onto the mirrored display. When the test device is a smart phone device, the RTS system translates those input interactions compatible with the smart phone. Examples of smart phone input interactions include gestures, pinches, swipes, taps, and others. The remote device display is mirrored on the developer's local machine. In this manner, the developer can experience a seamless interaction with the remote device using the developer's local machine. The RTS can be used both for development of launched and unlaunched products.

FIG. 1 illustrates an example RTS 100. Although some embodiments use the RTS 100 in the context of testing and software development, the RTS 100 can be used to enable a remote session for any purpose. Testing is merely provided as an example context of usage area of the system and infrastructure of the RTS 100. A user 102 uses a local machine 104 to launch a browser 106 to access a dashboard application to interact with the RTS 100, connect to a remote device and to conduct tests on the remote device. In some embodiments, the dashboard website/web application may be replaced by a desktop application, which the user 102 can install on the local machine 104. The user 102 may be a software developer, such as a website developer, web application developer or a mobile application developer. The local machine 104, in a typical case, may be a laptop or desktop computer, which the user 102 can use to write software code, debug, or run tests on a website/web application or mobile application. The user 102 can enter a uniform resource locator (URL) 108 in browser 106 to connect to the dashboard application powered by a server 110. The server 110 can enable the browser 106 and a remote device 114 to establish a connection. The RTS 100 can use the connection for streaming the display of a remote device 114 onto the browser 106 in order to mirror the display of the remote device 114 and present it to the user 102. The RTS 100 can also capture user inputs entered into the mirrored display and input them to the remote device 114.

The RTS 100 can include multiple datacenters 112 in various geographical locations. The datacenters 112 can include a variety of test devices for the users 102 to connect with and to conduct tests. In this description, the test devices in datacenters 112 are referred to as remote devices 114, as they are remote, relative to the user 102 and the user's local machine 104. A variety of communication networks 116 can be used to enable connection between the browser 106, the server 110 and the remote device 114. The remote devices 114 can include various hardware platforms, provided by various manufacturers, different versions of each brand (for example, old, midmarket, new) and optionally various copies of each brand, to enable availability for numerous users 102 to connect and conduct tests.

The RTS 100 can use a host 118 connected to one or more remote devices 114. In some embodiments, the browser 106 does not directly communicate with the remote device 114. The host 118 enables communication between the browser 106 and the remote device 114 through one or more private and/or public communication networks. The host 118 can be a desktop, laptop, or other hardware connected with a wired or wireless connection to the remote device 114. The hardware used for the host 118 can depend on the type of the remote device 114 that it hosts. Examples of host 118 hardware can include Apple Macintosh® computers for iPhone® and iOS® devices and Zotac® for Android® devices.

The RTS 100 mirrors the display of the remote device 114 on the browser 106, by generating a display 120 on the browser 106. In some embodiments, the display 120 can be a graphical, or pictorial replica representation of the remote device 114. For example, if an iPhone® 12 device is chosen, the display 120 can be an image of an iPhone® 12. The RTS 100 mirrors the display of the remote device 114 on the display 120 by streaming a video feed of the display of the remote device 114 on the display 120. In some embodiments, the video stream used to mirror the display of the remote device 114 is generated by capturing and encoding screenshots of the display of the remote device 114 into a video stream feed of high frames per second to give the user 102 a seamless interaction experience with the display 120. Using input devices of the local machine 104, the user 102 can interact with the display 120, in the same manner as if the remote device 114 were locally present.

The RTS 100 captures and translates the user interactions to input commands compatible with the remote device 114 and inputs the translated input commands to the remote device 114. The display responses of the remote device 114 are then streamed to the user 102, via display 120. In some embodiments, the user 102 has access to and can activate other displays and menu options, such as developer tools display 122. An example usage of the RTS 100, from the perspective of the user 102, includes, the user 102, opening a browser on the remote device 114, via menu options provided by the dashboard application. The user 102 can access the dashboard application via the browser 106 on the user's local machine 104. The RTS 100 opens the user's selected browser on the remote device 114 and generates a display of the remote device 114 and the remotely opened browser on the browser 106 on the user's local machine 104. The user 102 can then use a mouse to click on a URL field 124 in the display 120, which corresponds to the URL field in the browser on the remote device 114. The user 102 can subsequently enter a URL address in the URL field 124. Simultaneously, the user's interactions, such as mouse clicks and keyboard inputs are captured and translated to the input commands compatible with the remote device 114 at the datacenter 112. For example, the mouse click in the URL field 124 is translated to a tap on the corresponding location on the display of the remote device 114 and the keyboard inputs are translated to keyboard inputs of the remote device 114, causing the remote device 114 to open the user requested URL and download the user requested website. Simultaneously, a video stream of the display of the remote device 114 is sent to and generated on the display 120 on browser 106. In this manner, the user perceives entering a URL in the URL field 124 and seeing the display 120 (a replica of the remote device 114) open the requested URL. Additional interactions of the user 102 can continue in the same manner. The user 102 can use the RTS 100 in the manner described above to perform manual or automated testing.

The display 120 is a pictorial and graphical representation of the remote device 114. The RTS 100 does not open a copy of the browser opened on the remote device 114 or conduct simultaneous parallel processes between the remote device 114 and the local machine 106. Instead, the RTS 100 streams a video feed from the remote device 114 to generate the display 120. Consequently, the user's interactions is inputted to the display 120, appearing as if a functioning browser is receiving the interactions, while the RTS 100 captures, transfers and translates those interactions to the remote device 114, where the functioning browser is operating on the remote device 114.

Figure 2:
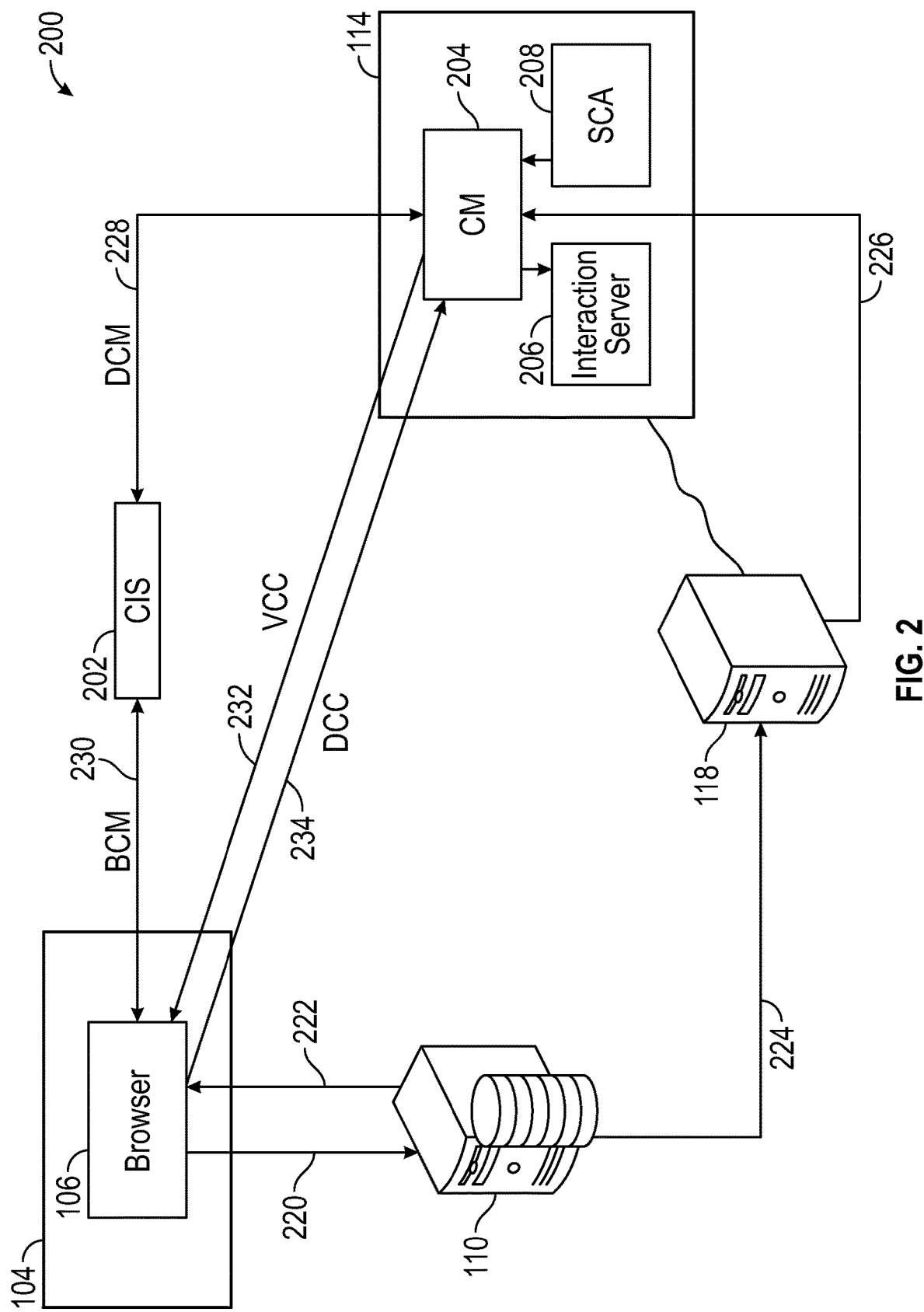
FIG. 2 illustrates a diagram of an example data flow implementation of the embodiment of FIG. 1.

FIG. 2 illustrates a diagram 200 of an example data flow implementation of the RTS 100. The example shown in FIG. 2 will be described in the context of the user 102 requesting to start a remote session. The remote session can be used for a variety of purposes. In one example, the remote session can be used to test a web application or a website. The user launches a dashboard application using the browser 106, running on the user's local machine 104. The dashboard application can provide menu options to the user 102 to choose initial test session parameters, including a type/brand of a test device, operating system, a browser brand, and an initial test URL to access. The browser 106, running the dashboard application, can generate and send a request 220 for starting a remote session to the server 110. The server 110 can be a central or a distributed server over several geographical locations, enabling access to the RTS 100 from various locations. The request 220 can include details, such as a type/brand of a test device, operating system, a browser brand, and an initial test URL to access. In response to the user's request 220, the RTS 100 can select a datacenter 112, a test device 114, and can dynamically generate a test session identifier (ID). In some embodiments, a communication network is used to enable communication between the browser 106 and the remote device 114. The RTS 100 can choose a communication initiation server (CIS) 202 and associate the test session ID with the CIS 202. The selected CIS 202 can be communicated to both the browser 106 and the remote device 114, using an identifier of the selected CIS 202 or a CIS ID. In some embodiments, the CIS 202 can help the browser 106 and the remote device 114 to establish a peer-to-peer (P2P) communication network to directly connect. Other communication networks can also be used.

The server 110 can provide initial handshake data to both the remote device 114 and the browser 106, in order to establish a communication network. For example, after choosing the CIS 202 and other initial parameters, the server 110 can issue a start session response 222 to the browser 106. The start session response 222 can include details, such as the test session ID and an identifier of the CIS 202 to be used for establishing communication. The server 110 can send a session parameter message (SPM) 224 to the host 118. The SPM 224 can include parameters of the test session, such as the CIS ID, selected device ID, test session ID, browser type, and the requested URL. The host 118 routes the SPM 224 via a message 226 to a communication module (CM) 204 of the remote device 114. The CM 204 can be a hardware, software or a combination component of the remote device 114, which can handle the communication with the browser 106. Depending on the type of communication network and protocol used, the structure and functioning of the CM 204 can be accordingly configured. For example, in some embodiments, the CM 204 can handle WebRTC messaging, encoding of the screenshots from the remote device 114, transmitting them to the browser 106 and handling the interactions received from the browser 106.

The browser 106, via the start session response 222 receives the CIS 202 ID and the test session ID. The CM 204, via the message 226, receives the same information. The CM 204 can send a device connection message (DCM) 228 to the CIS 202. The browser 106 can send a browser communication message (BCM) 230 to the CIS 202. Both DCM 228 and BCM 230 use the same test session ID. Therefore, the CIS 202 can authenticate both and connect them. Once connected, the browser 106 and the remote device 114 can exchange communication data and the routes via which they can communicate. For example, they can indicate one or more intermediary servers that may be used to carry on their communication.

In some embodiments, Web real-time communication (WebRTC) can be used to enable communication between the remote device 114 and the browser 106, for example, when the remote device 114 is a smartphone device. In this scenario, the CM 204 can include, in part, a libjingle module, which can implement the WebRTC protocol handshake mechanisms in the remote device 114. The handshake made available through the CIS 202 allows the remote device 114 and the browser 106 to exchange communication data routes and mechanisms, such as traversal using relays around NAT (TURN) servers, session traversal utilities for NAT (STUN) servers, interactive connectivity establishment (ICE) candidates, and other communication network needs. NAT stands for Network Address Translation.

Once the communication network between the browser 106 and the remote device 114 is established, a plurality of channels can be established between the two. Each channel can in turn include a plurality of connections. For example, the communication network between the browser 106 and the remote device 114 can include a video communication channel (VCC) 232. The VCC 232 can include a plurality of connections between the browser 106 and the remote device 114 and can be used to transmit a video stream of the display of the remote device 114 to the browser 106. The communication network between the browser 106 and the remote device 114 can also include a data communication channel (DCC) 234. The DCC 234 can include a plurality of connections between the browser 106 and the remote device 114 and be used to transmit the interactions the user 102 inputs into the mirrored display of the remote device generated on the browser 106. The mirrored display can alternatively be described as a replica display of the remote device 114.

To generate a mirrored display of the remote device 114 on the browser 106, the captured screenshots from a screen capturing application (SCA) 208 can be assembled into a video stream and transmitted to the browser 106. The process of assembling the screenshots from the SCA 208 to a video stream may include performing video encoding, using various encoding parameters. Encoding parameters may be dynamically modifiable or may be predetermined. As an example, the available bandwidth in VCC 232 can vary depending on network conditions. In some embodiments, a frames-per-second encoding parameter can be adjusted based in part on the available bandwidth in the VCC 232. For example, if a low bandwidth in VCC 232 is detected, the video stream constructed from the captured screenshots can be encoded with a downgraded frames-per-second parameter, reducing the size of the video stream, and allowing an interruption free (or reduced interruption) transmission of the live video stream from the remote device 114 to the browser 106.

Another example of dynamically modifying the encoding parameters include dynamically modifying, or modulating the encoding parameter, based on the availability of hardware resources of the remote device, or the capacity of the hardware resources of the remote device 114 that can be assigned to handle the encoding of the video stream. The CM 204 can use the hardware resources of the remote device 114 in order to encode and transmit the video stream to the browser 106. For example, CM 204 can use the central processing unit (CPU) of the remote device 114, a graphics processing unit (GPU) or both to encode the video stream. In some cases, these hardware resources can be in high usage, reducing their efficiency in encoding. The reduction in hardware resources availability or capacity can introduce interruptions in the encoding. In some embodiments, a frame rate sampling parameter of the encoding parameters can be modulated based on the availability or capacity of hardware resources, such as the CPU and/or the GPU of the remote device 114 that can be assigned to handle the encoding of the video stream. For example, if a high CPU usage is detected, when the CPU is to be tasked with encoding, the CM 204 can reduce the sampling rate parameter of the encoding, so the CPU is not overburdened and interruptions in the video feed are reduced or minimized.

The CM 204 can also configure the encoding parameters, based on selected parameters at the browser 106. The browser 106 receives the video stream via the VCC 232, decodes the video stream and displays in the video stream in a replica display of the remote device 114 on the browser 106. In some embodiments, a predetermined threshold frames-per-second parameter of the video stream at the browser 106 can be selected. The predetermined threshold frames-per-second parameter can be based on a preselected level of quality of the video stream displayed on the replica display. For example, in some embodiments, the predetermined threshold frames-per-second parameter at the browser can be set to a value above 25 frames-per-second to generate a seamless and smooth mirroring of the display of the remote device 114 on the browser 106. The CM 204 can configure the encoding parameters at the remote device 114 based on the predetermined threshold frames-per-second parameter set at the browser 106. For example, the CM 204 can encode the video stream with a frame rate above 30 fps, so the decoded video stream at the browser 106 has a frames-per-second parameter above 25 fps.

In some embodiments, the screen capturing application (SCA) 208 can be used to capture screenshots from the remote device 114. The SCA 208 can differ from device to device and its implementation and configuration can depend on the processing power of the device and the mandates of the operating system of the device regarding usage of the CPU/GPU in capturing and generating screenshots. For example, in Android® environment, the Android® screen capture application programming interface (APIs) can be used. In iOS® devices, iOS® screen capture APIs can be used. Depending on the processing power of the selected remote device 114, the SCA 208 can be configured to capture screenshots at a predefined frames per second (fps) rate. Additionally, the SCA 208 can be configured to capture more screenshots at the remote device 114 than the screenshots that are ultimately used at the browser 106. This is true in scenarios where some captured screenshots are dropped due to various conditions, such as network delays and other factors. For example, in some embodiments, the SCA 208 can capture more than 30 fps from the display of the remote device 114, while at least 20 fps or more are able to make it to the browser 106 and shown to the user 102. In the context of packaging and assembling the captured screenshots into a video stream transmitted to the browser 106, screenshots that are received out of order may need to be dropped to maintain a fluid experience of the remote device 114 to the user 102. For example, the captured screenshots are streamed over a communication network to the browser 106, using various protocols, including internet protocol suite (TCP/IP), user datagram protocol, and/or others. When unreliable transmission protocols are used, it is possible that some screenshots arrive at browser 106 out of order. Out of order screenshots can be dropped to maintain chronology at the video stream displayed on browser 106. Some captured screenshots might simply drop as a result of other processing involved. For example, some screenshots may be dropped, due to lack of encoding capacity, if heavy animation on the remote device 114 is streamed to the browser 106. Consequently, in some embodiments, more screenshots are captured at the remote device 114 than are ultimately shown to the user 102.

The upper threshold for the number of screenshots captured at the remote device 114 can depend, in part, on the processing power of the remote device 114. For example, newer remote devices 114 can capture more screenshots than older or midmarket devices. The upper threshold for the number of screenshots can also depend on an expected bandwidth of a communication network between the remote device 114 and the browser 106.

The SCA 208 can be a part of or make use of various hardware components of the remote device 114, depending on the type of the selected remote device 114, its hardware capabilities and its operating system requirements. For example, some Android® devices allow usage of the device's graphical processing unit (GPU), while some iOS® devices limit the usage of GPU. For remote devices 114, where the operating system limits the use of GPU, the SCA 208 can utilize the central processing unit (CPU) of the remote device 114, alone or in combination with the GPU to capture and process the screenshots. The SCA 208 can be implemented via the screen capture APIs of the remote device 114 or can be independently implemented. Compared to command line screen capture tools, such as screencap command in Android®, the SCA 208 can be configured to capture screenshots in a manner that increases efficiency and reliability of the RTS 100. For example, command line screenshot tools, may capture high resolution screenshots, which can be unnecessary for the application of the RTS 100, and can slow down the encoding and transmission of the video stream constructed from the screenshots. Consequently, the RTS 100 can be implemented via modified native screenshot applications, APIs or independently developed and configured to capture screenshots of a resolution suitable for efficient encoding and transmission. As an example, using command line screen capture tools, a frames-per-second rate of only 4-5 can be achieved, which is unsuitable for mirroring the display of the remote device 114 on the browser 106 in a seamless manner. On the other hand, the described embodiments achieve frames-per-second rates of above 20 frames per second. In some embodiments, the CM 204 can down-sample the video stream obtained from the captured screenshots, from for example, a 4K resolution to a 1080P resolution. Still, in older devices, the down-sampling may be unnecessary, as the original resolution may be low enough for efficient encoding and transmission.

In some embodiments, the remote device 114 and the browser 106 can connect via a P2P network, powered by WebRTC. The CM 204 can then include a modified libjingle module. In the context of the RTS 100, the relationship between the browser 106 and the remote device 114 is more of a client-server type relationship than a pure P2P relationship. An example of a pure P2P relationship is video teleconferencing, where both parties transmit video to one another in equal and substantial size. In the context of the RTS 100, the transfer of video is from CM 204 to the browser 106, and no video is transmitted from the browser 106 to the CM 204. Therefore, compared to a P2P libjingle, the CM 204 and its libjingle module, as well as communication network parameters between the browser 106 and the remote device 114, can be modified to optimize for the transfer of video from the remote device 114 to the browser 106. An example modification of libjingle includes modifying the frames-per-second rate in favor of video transfer from the remote device 114. Other aspects of encoding performed by libjingle module of the CM 204 can include adding encryptions and/or other security measures to the video stream. When WebRTC is used to implement the communication network between the remote device 114 and the browser 106, libjingle module of the CM 204 can encode the video stream in WebRTC format.

While FIG. 2 illustrates messaging lines directly to the CM 204, this is not necessarily the case in all embodiments. In some implementations, the DCM 28, BCM 230, VCC 232, and DCC 234 can be routed through the host 118. The communication network between the remote device 114 and the browser 106, having channels, VCC 232 and DCC 234 can be implemented over the internet via a WiFi connection at the datacenter 112 where the remote device 114 is located, or can be via an internet over universal serial bus (USB) via the host 118, or a combination of wired or wireless communication to the internet. In some cases, one or more methods of connecting to the internet is used as a backup to a primary mode of connection to the internet and establishing the communication network between the remote device 114 and the browser 106.

The CM 204 can receive, via the DCC 234, user interactions inputted to the replica display on the browser 106. The CM 204 can route the received user interactions to an interaction server 206 for translation to a format compatible with the remote device 114. In a typical case, the user 102 runs the browser 106 on a laptop or desktop machine and inputs commands and interacts with the replica display on the browser 106, using the input devices of the local machine 104. Input devices of the local machine 104 generate mouse or keyboard user interactions, which are captured and transferred to the CM 204. In some embodiments, JavaScripts® can be used to capture user interactions inputted in the replica display on the browser 106. The captured user interactions are then encoded in a format, compatible with the format of the communication network established between the browser 106 and the remote device 114. For example, if WebRTC is used, the user interactions are formatted in the WebRTC format and sent over the DCC 234 to the CM 204.

The CM 204 decodes and transfers the user interactions to the interaction server 206. The interactions server 208 translates the mouse and keyboard user interactions to inputs compatible with the remote device 114. For example, when the remote device 114 is a mobile device, such as a smartphone or tablet having a touch screen as an input device, the interaction server 206 can translate keyboard and mouse inputs to gestures, swipes, pinches, and other commands compatible with the remote device 114. The translation of user interactions to remote device inputs also takes advantage of the coordinates of the inputs. For example, a meta data file accompanying the user interactions can note the coordinates of the user interactions on the replica display on the browser 106. The meta data can also include additional display and input device information of the user local machine 104 and the replica display on the browser 106.

The interaction server 206 also maintains or has access to the resolution and setup of the display of the remote device 114 and can make a conversion of a coordinate of an input on the replica display versus a corresponding coordinate on the real display of the remote device 114. For example, in some embodiments, the interaction server 206 can generate coordinate multipliers to map a coordinate in the replica display on the browser 106 to a corresponding coordinate in the real display of the remote device 114. The coordinate multipliers can be generated based on the resolutions of the replica display and the real display. The interaction server 206 then inputs the translated user interactions to the remote device 114. The display output of the remote device 114 responding to the input of the translated user inputs are captured via the SCA 208, sent to the CM 204, encoded in a format compatible with the communication network between the remote device 114 and the browser 106 (e.g., WebRTC) and sent to the browser 106. The browser 106 decodes the received video stream, displaying the video stream in the replica display on the browser 106. The data flow over the DCC 234 and the VCC 232 happen simultaneously or near simultaneously, as far as the perception of the user 102, allowing for a seamless interaction of the user 102 with the replica display, as if the remote device 114 were present at the location of the user 102.

Figure 3:
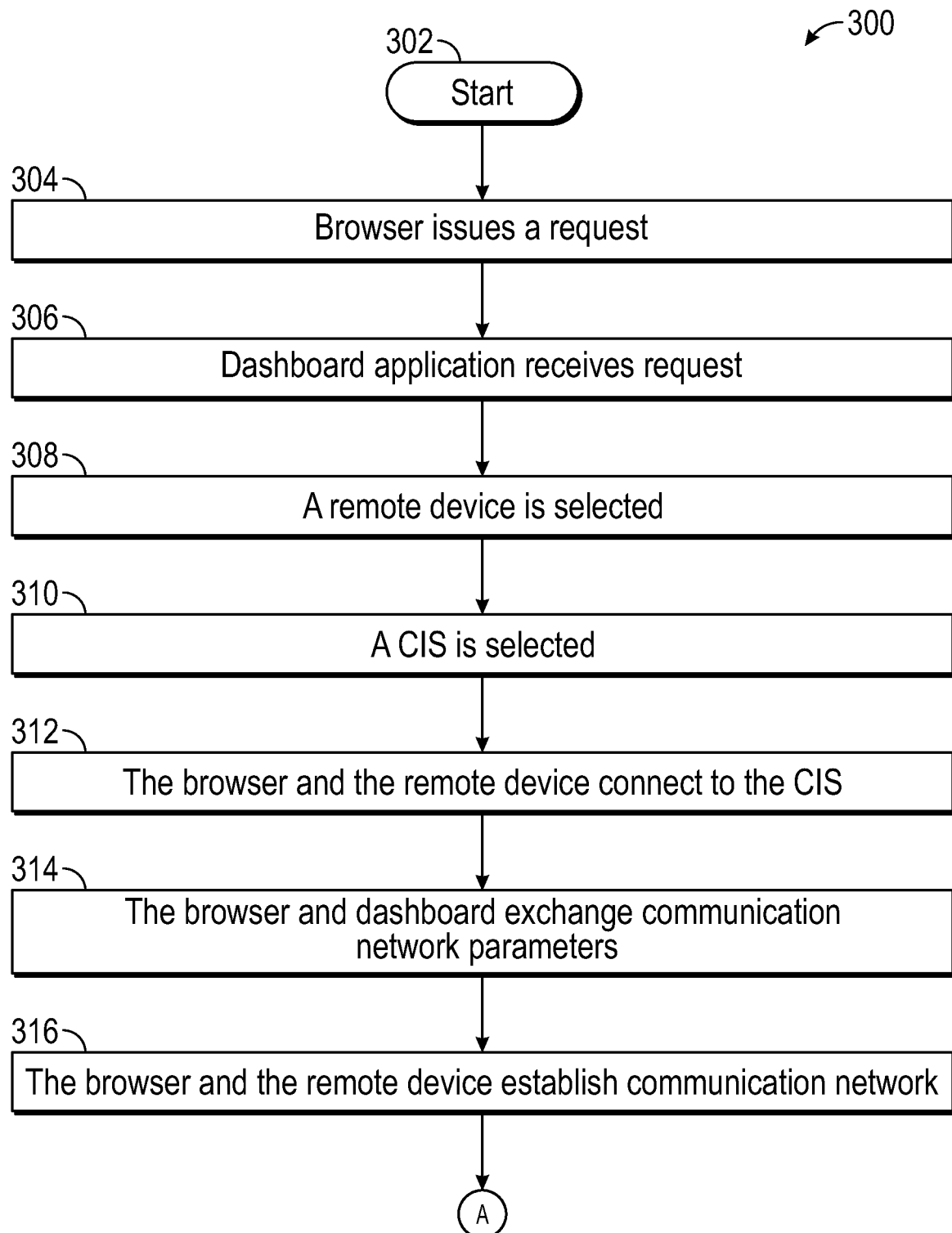
FIG. 3 illustrates a flow chart of a method of enabling a remote session at a first location using a remote device at a second location.
Figure 3:
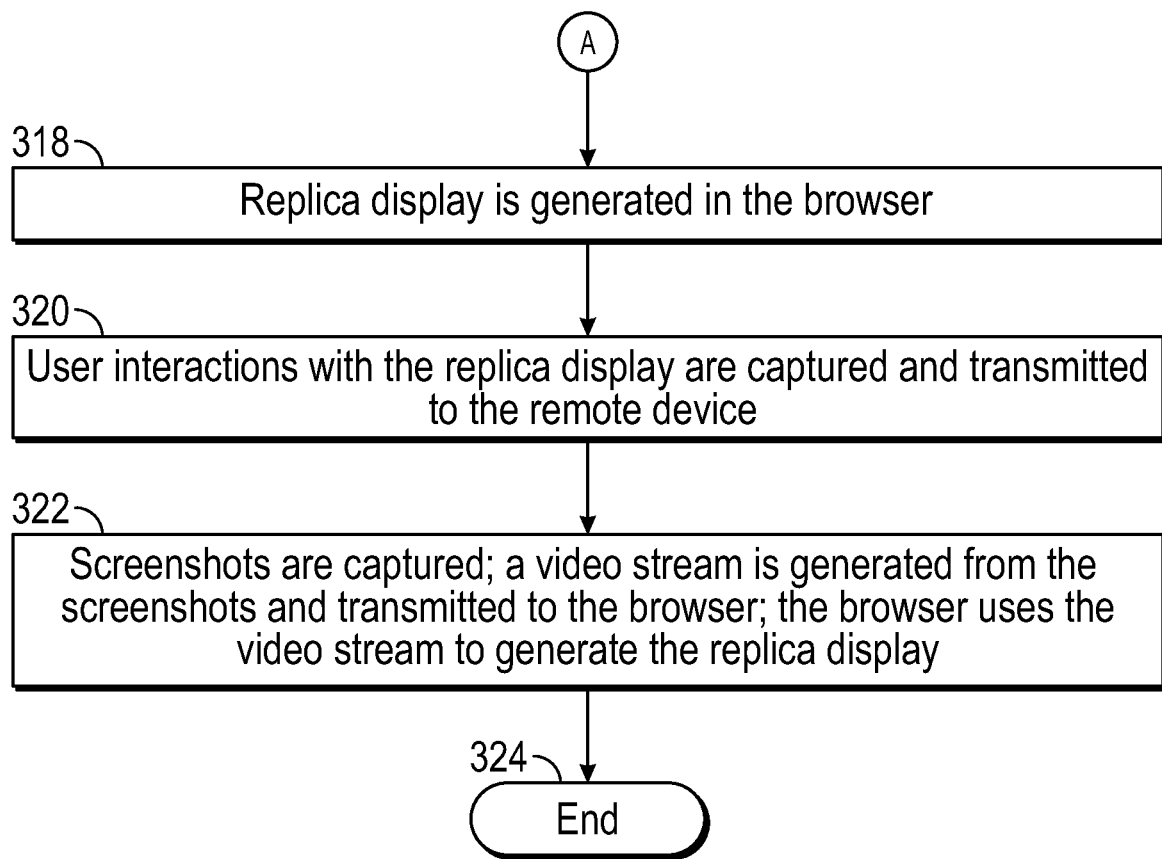

FIG. 3 illustrates a flow chart of a method 300 of enabling a remote session at a first location using a remote device at a second location. The method 300 utilizes the RTS 100 as described above. The method 300 starts at step 302. At step 304, the browser 106 at a first location issues a request 220 to start a remote session at the first location, using a remote device at the second location. The request 220 can include a type/brand of a remote device, a browser to be opened on the remote device and a test URL to be accessed on the remote device. At step 306, the request 220 is received at a dashboard application of the RTS 100. The dashboard application may be locally installed, as a desktop application or may be a web application, accessible via a URL entered in the browser 106. The dashboard application can be powered by a server 110. At step 308, the server 110 can select a remote device 114 from a plurality of remote devices at the second location. The selection of the remote device is based on the user choice in the request 220. The selected remote device 114 can launch the browser type/brand, as indicated in the request 220. The selected remote device 114 can access the test URL, as indicated in the request 220.

At step 310, the server 110 selects a communication initiation server (CIS) 202 to allow the browser 106 and the selected remote device 114 to establish a connection. At step 312, both the browser 106 and the remote device 114 connect to the CIS 202, using the same test session ID. At step 314, the browser 106 and the remote device 114, via the CIS 202, exchange parameters of a communication network between the two. At step 316, the browser 106 and the remote device 114 establish the communication network, using the exchanged parameters. The exchanged parameters can include the routes, ports, gateways, and other data via which the browser 106 and the remote device 114 can connect. The communication network between the two includes a video channel, VCC 232 and a data channel, DCC 234.

At step 318, a replica display of the selected remote device 114 is generated in the browser 106. The browser 106 can receive, via the video channel, a video stream of the display output of the remote device 114 and use that to generate the replica display. At step 320, user interactions with the replica display are captured and transmitted, via the data channel DCC 234 to the remote device 114. At step 322, the SCA 208 captures screenshots of the display screen of the remote device 114. The CM 204 uses the captured screenshots to generate a video stream of the screen of the remote device 114. The CM 204 transmits, via the video channel VCC 232, the video stream to the browser 106, which uses the video stream to generate the replica display. The method 300 ends at step 324.

Figure 4:
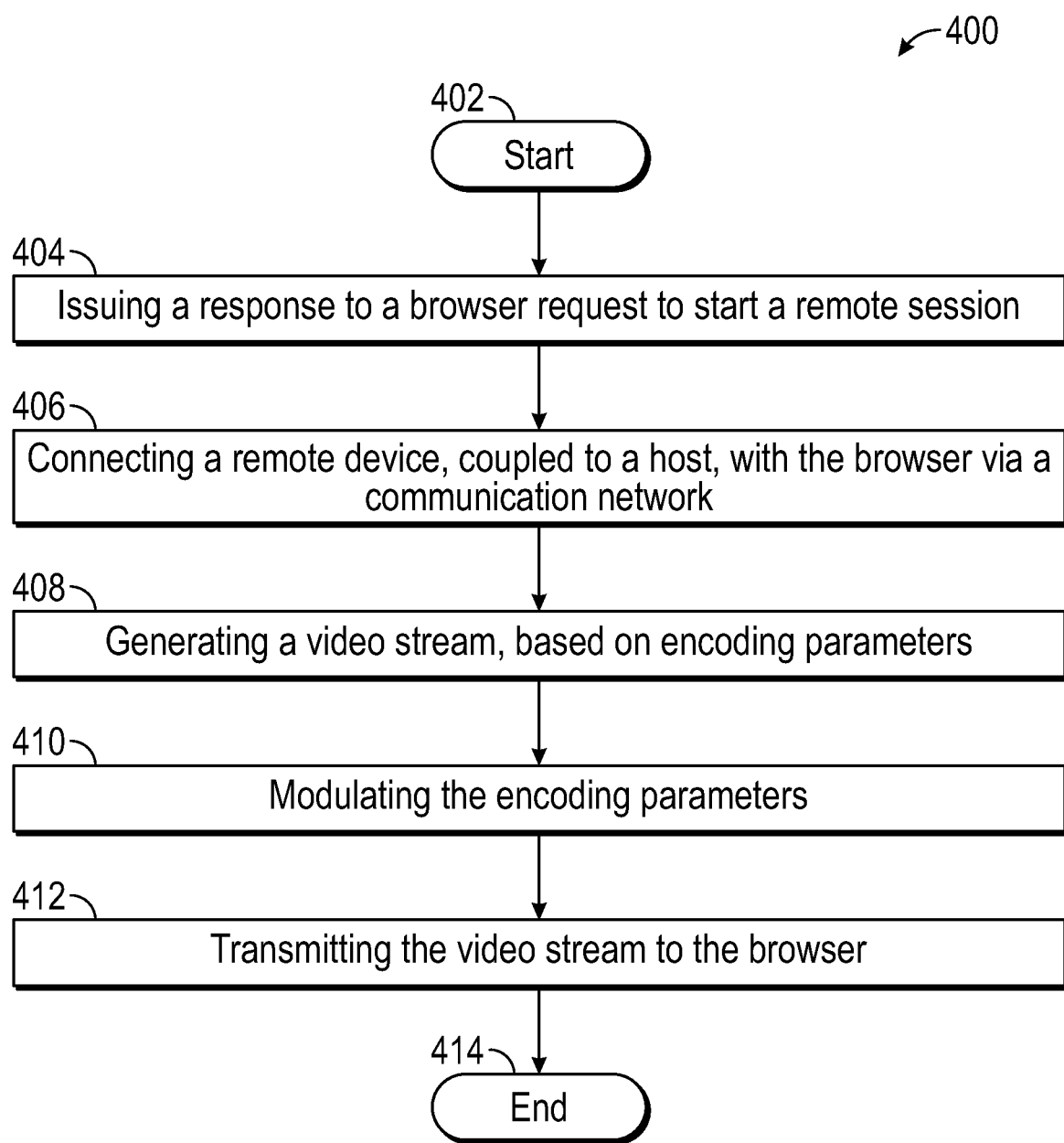
FIG. 4 illustrates a flowchart of a method of an example operation of a remote test system.

FIG. 4 illustrates a flowchart of a method 400 of an example operation of the RTS 100. The method 400 starts at step 402. At step 404, a request to start a remote session using a remote device is received at a dashboard application, powered by a server 110. The server 110 selects a CIS 202, a remote device 114 and issues a response to the browser 106. The response includes an identifier of the CIS 202 and an identifier of the test session. At step 406, the browser 106 and the remote device 114 establish a communication network and connect to one another using the communication network. Ther remote device 114 connects to the communication network via a host 118.

At step 408, the CM 204 generates a video stream from the screenshots captured by the SCA 208, based on one or more encoding parameters. An example of the encoding parameters includes a frames-per-second parameter of the encoding. At step 410, the CM 204 modules the encoding parameters based on one or more factors, including bandwidth of the VCC 232, and available capacity of hardware resources of the remote device 114 for encoding operations, including capacity of CPU and/or GPU of the remote device 114. The CM 204 can also modulate the encoding parameters based on a predetermined minimum threshold of frames per second video stream decoded and displayed at the browser 106. At step 412, the CM 204 transmits the video stream to the browser 106 to display. The method 400 ends at step 414.

Figure 5:
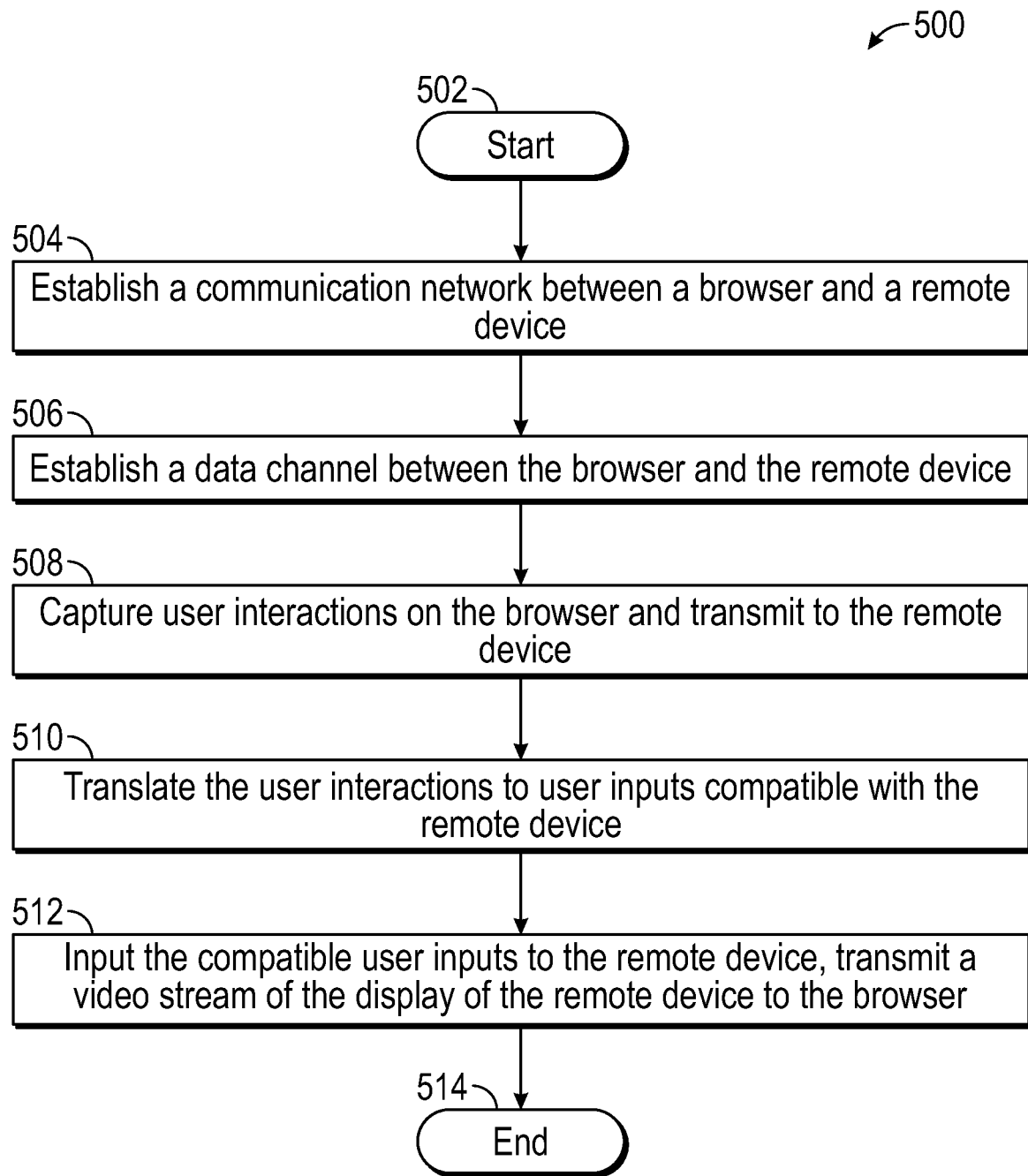
FIG. 5 illustrates another flowchart of a method of an example operation of the remote system.

FIG. 5 illustrates a flowchart of a method 500 of an example operation of the RTS 100. The method starts at step 502. At step 504, a communication network is established between the browser 106 and the remote device 114. In some embodiments, the communication network can be a P2P, WebRTC. The CM 204 in the remote device 114 can handle the translation, encoding and data packaging for transmission over the communication network. At step 506, a data channel DCC 234 is established using the communication network. The data channel can be used to transmit user interactions entered into a replica display in browser 106 to the remote device 114. At step 508, the user interactions with the replica display on browser 106 are captured and transmitted to the CM 204. In some embodiments, the DCC 234 is through the host 118 and in other embodiments, a WiFi network at datacenter 112 where the remote device 114 is located can be used to connect the CM 204 and the browser 106. The CM 204 transfers the user interactions to the interaction server 206.

At step 510, the interaction server 206 translates the user interactions to user inputs compatible with the remote device 114. For example, if the remote device 114 is a mobile computing device, such as a smartphone or smart tablet, the interaction server 206 translates keyboard and mouse inputs to touch screen type inputs, such as taps, swipes, pinches, double tap, etc. The interaction server 206 may use coordinate multipliers to translate the location of a user interaction to a location on the display of the remote device 114. The coordinate multipliers are derived from the ratio of the resolution and/or size difference between the replica display on the browser 106 and the display screen of the remote device 114. At step 512, the user inputs are inputted into the remote device 114 at the corresponding coordinates. The remote devices's display output response to the user inputs are captured via SCA 208, turned into a video stream and transmitted to the browser 106. The browser 106 displays the video stream in the replica display. The method 500 ends at the step 514.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 6:
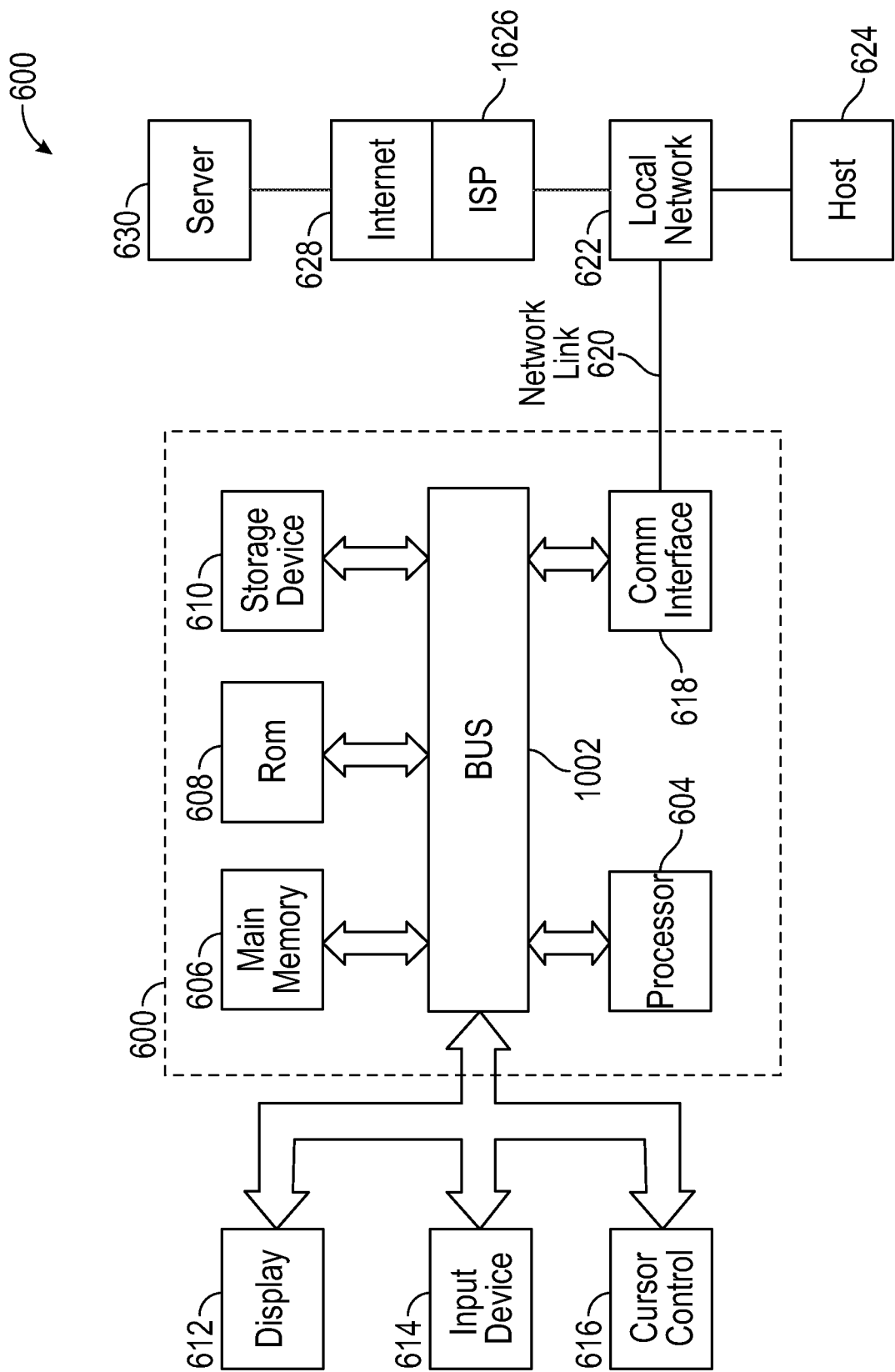
FIG. 6 illustrates an example environment within which some described embodiments can be implemented.

For example, FIG. 6 is a block diagram that illustrates a computer system 600 upon which an embodiment of can be implemented. Computer system 600 includes a bus 602 or other communication mechanism for communicating information, and a hardware processor 604 coupled with bus 602 for processing information. Hardware processor 604 may be, for example, special-purpose microprocessor optimized for handling audio and video streams generated, transmitted or received in video conferencing architectures.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid state disk is provided and coupled to bus 602 for storing information and instructions.

Computer system 600 may be coupled via bus 602 to a display 612, such as a cathode ray tube (CRT), liquid crystal display (LCD), organic light-emitting diode (OLED), or a touchscreen for displaying information to a computer user. An input device 614, including alphanumeric and other keys (e.g., in a touch screen display) is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the user input device 614 and/or the cursor control 616 can be implemented in the display 612 for example, via a touch-screen interface that serves as both output display and input device.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

Some remote devices 114 do not provide a high-performance screenshot capturing API, suitable for efficient operations of the RTS 100. On the other hand, some operating systems of the remote devices 114 can support a video capturing API for the purposes of recording and/or broadcasting the display of the remote device 114 in real time. In these scenarios, the SCA 208 can be implemented using a video capturing API of the operating system of the remote device 114. As an example, for some iOS® devices, when the SCA 208 is implemented, using a native screenshot application, the FPS achieved on browser 106 can drop to as low as 5 FPS in some cases. At the same time, iOS® in some versions, provides a video capturing facility, such as ReplayKit, which can be used to implement the operations of the SCA 208. When a video capturing API is used, corresponding modifications to the data flow and operations of the RTS 100 are also implemented as will be described below.

Figure 7:
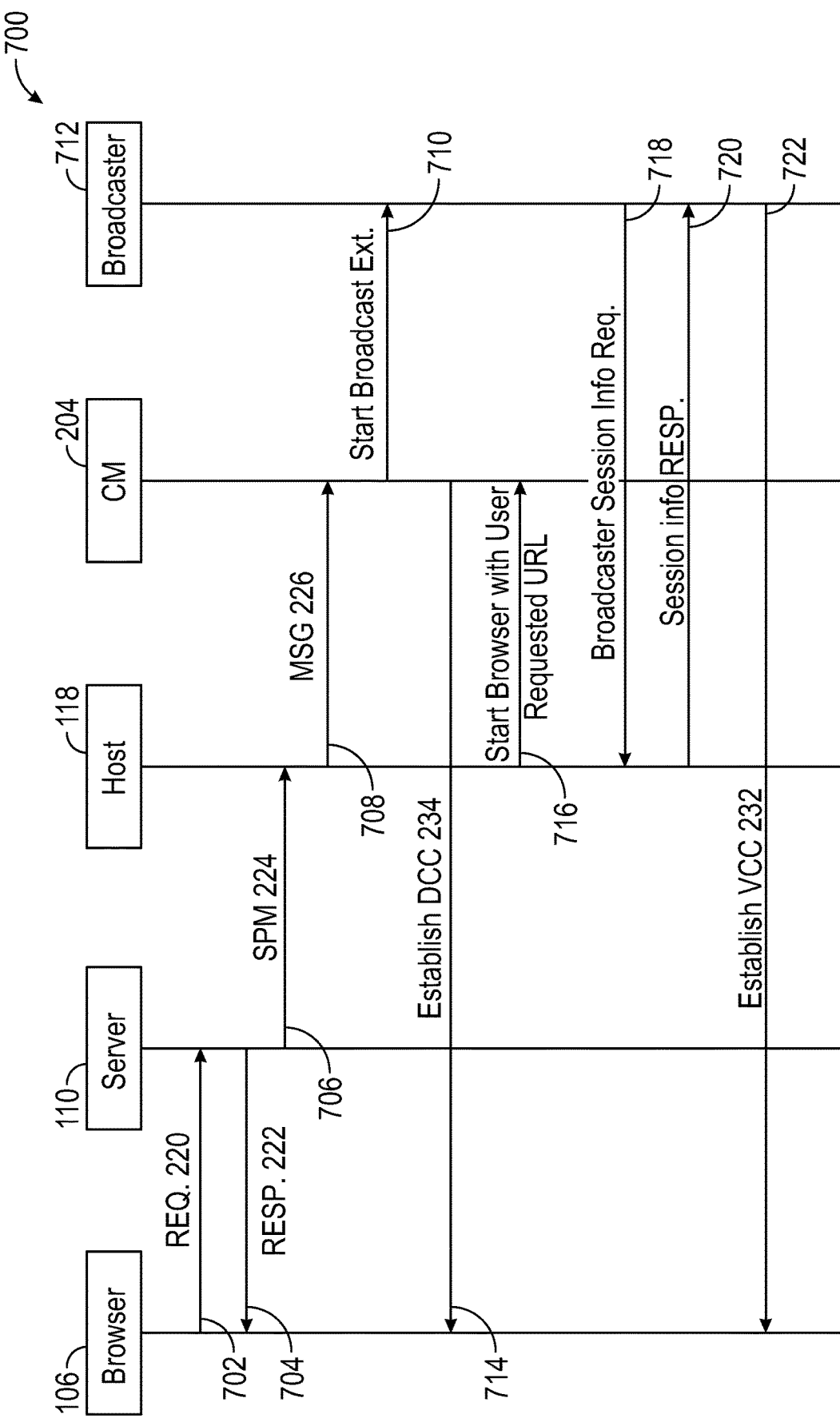
FIG. 7 illustrates an example data flow diagram of the operations of an infrastructure enabling a remote session using a remote device, using a video capturing API.

FIG. 7 illustrates an example data flow diagram 700 of the operations of the RTS 100, using a video capturing API for implementing the SCA 208. The diagram 700 is provided as an example. Persons of ordinary skill in the art can modify the diagram 700, without departing from the spirit of the disclosed technology. Some platforms and operating systems may provide an API for capturing a video stream of the remote device 114. For example, iOS® provides such an API in ReplayKit. The captured video stream can be used to replicate the display of the remote device 114 in lieu of using static screenshots to generate the video stream. In some cases, the SCA 208 can be implemented using the video capturing API provided by the remote device 114. For example, a launcher application can include a broadcaster extension, which can output a video stream of the display of the remote device 114. In other embodiments, a broadcast extension, broadcasting the video stream, can be an extension to a launcher application, which the host 118 uses to control the operations of the remote device 114. Various implementations are possible. Some are described below.

At step 702, the browser 106 can send a request 220 to start a remote session to the server 110. At step 704, the server 110 can respond by sending a response 222 to the browser 106. At step 706, the server 110 can send a SPM 224 to the host 118. At step 708, the host 118 can send a message 226 to the CM 204. The steps 702-708 enable the remote device 114 and the browser 106 to log in to a communication initiation server (CIS) 202 with the same credentials, such as a common remote session identifier, thereafter, exchange communication network parameters, and establish communication using the communication network.

At step 710, the CM 204 can signal a broadcaster 712 to launch and begin capturing a video stream of the display of the remote device 114. As described earlier, the broadcaster 712 can be a stand-alone application or can be an extension to a launcher application that the host 118 runs on the remote device 114 to perform the operations of the RTS 100. For example, when ReplayKit is used, the ReplayKit API provides a broadcaster extension which can run as an extension of an application and provide a video stream of the display of the remote device 114 to that application.

At this stage, the DCM 228 and the BCM 230 have already occurred between the browser 106 and the CM 204, allowing the browser 106 and the CM 204 to exchange network communication parameters via the CIS 202. The network communication parameters can include network pathways, servers, and routes via which the two can establish one or more future communication networks. The browser 106 and the CM 204 establish a communication network and connect using these network communication parameters. At step 714, the CM 204 can establish a DCC 234 with the browser 106. The DCC 234 can be used in the future operations of the RTS 100 to capture user interactions on the replica display generated on the browser 106 and transmit them to the remote device 114. At step 716, the host can extract a requested URL and a type of browser from the user's initial request (at step 720) and launch the chosen browser on the remote device 114, with a request for the remote device browser to access the user requested URL.

At step 718, the broadcaster 712 can query the host 118 for session and user data to determine where and how to establish a video channel to broadcast the video stream feed of the display of the remote device 114. At step 720, the host 118 responds to the broadcaster 712 with session and user data. The session and user data can include an identifier of the session, a user identifier, network details, gates and ports, pathways or other information related to the remote session and/or the communication network established between the CM 204 and the browser 106. At step 722, the broadcaster 712 can use the session and/or user data, received at step 720, to establish the VCC 232 and begin broadcasting the video stream of the display of the remote device 114 to the browser 106. A dashboard application, executable on and/or by the browser 106, can generate a replica display of the remote device 114 on the browser 106 and use the video stream received on the VCC 232 to populate the replica display with a live video feed of the display of the remote device 114. In some implementations, the CM 204 can set up or modify the encoding parameters of the video from the broadcaster 712. For example, the CM 204 can be configured to determine the bandwidth of the VCC 232 and modify the FPS encoding parameter of the video stream to increase the likelihood of an efficient, stable and/or performant video stream on the browser-end. The dashboard application executable on the browser 106 can decode the video received on the VCC 232 and use the decoded video to generate the replica display on the browser 106. Other examples of the CM 204 modifying the encoding parameters of the video sent on the VCC 232 are described above in relation to the pervious embodiments. The CM 204 can apply the same techniques to the embodiments, where a broadcaster 712 is used. As described earlier, having the VCC 232 consume a video stream, via the broadcaster 712, can offer advantages, such as more efficient encoding, and having a higher and more stable FPS performance.

Audio Injection

In some applications, the user 102 may wish to develop and/or test an application, website or software using the RTS 100, in which, as part of the development and/or testing, the application would receive an audio input through the microphone of the remote device 114. In the infrastructure of the RTS 100, the remote devices 114 are located in datacenters 112, and providing physical microphone input to remote devices 114 may be impractical or undesirable. Often several remote devices 114 may be placed in proximity to one another, and the environment of the datacenters 112 may include a variety of noise and background sounds that can interfere with playing back a test audio file to the microphone of a remote device 114. Consequently, the user 102 may utilize an audio injection feature of the RTS 100 to test and/or develop interactions of an application running on the remote device 114 with the microphone input of the remote device 114. Audio injection feature can enable the user 102 to provide a prerecorded or livestream audio file to the RTS 100, which the RTS 100 can play as input to an application running on a remote device 114, as the microphone input of the remote device 114 to the application.

Figure 8:
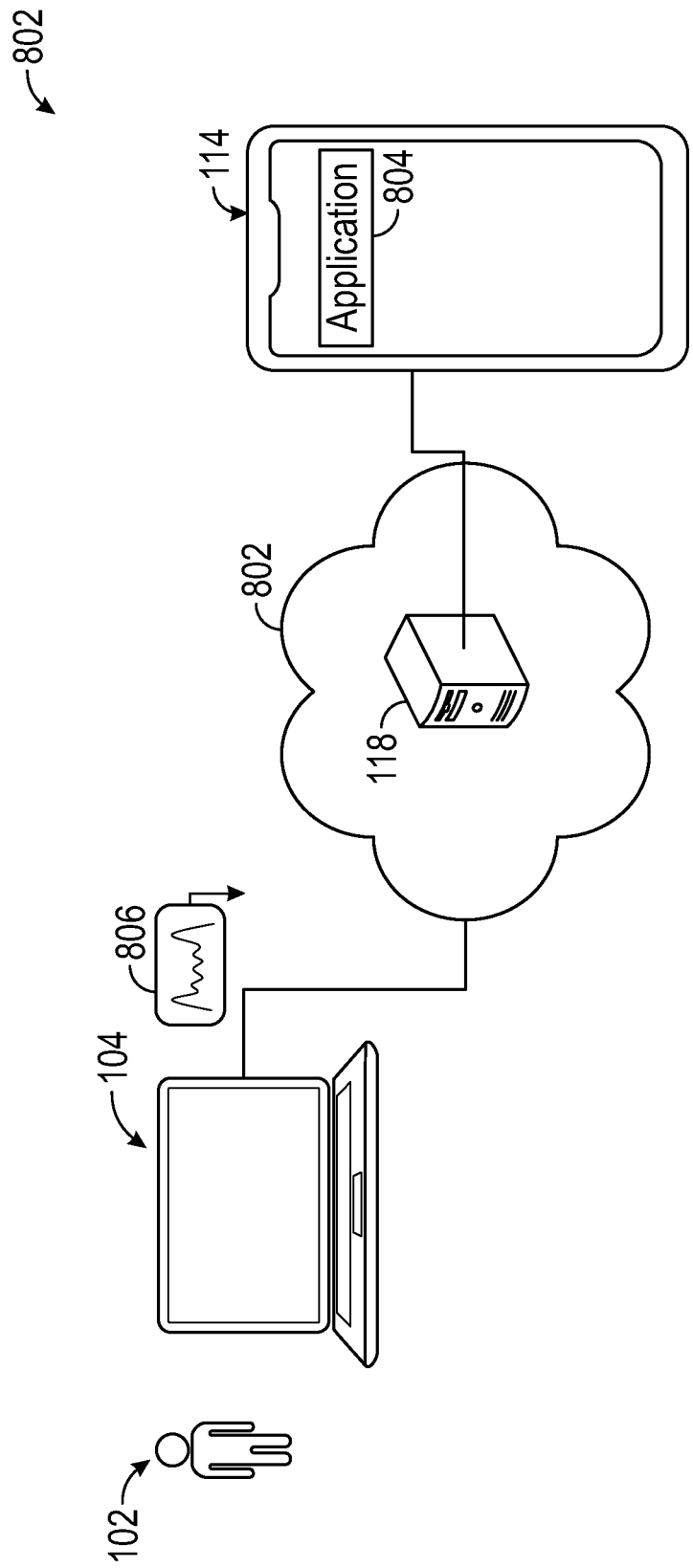
FIG. 8 illustrates an environment in which an audio injection feature of the embodiment of FIG. 1 can be deployed.

FIG. 8 illustrates an environment in which the audio injection feature of the RTS 100 can be deployed. The user 102 connects with the RTS network 802 to conduct test and software development on a remote device 114. The RTS network 802 can include a variety of software and hardware components on the Internet and/or the datacenter 112, as described above in relation to the embodiments of FIGS. 1-7, including servers, communication channels and the host 118. In the example shown, the user 102 can test and develop an application 804 on the remote device 114. The application 804 runs on the remote device 114 and the RTS 100 provides a video feed of the display of the remote device 114 to the user's local machine 104. The subject of testing and development can be any software, including applications, mobile applications, websites, web applications or any software program. The user 102 is interested in testing and observing the features and behaviors of the application 804 on a particular remote device 114. For some features, the application 804 might request an audio input from a microphone of the remote device 114. The features requiring microphone input can include for example, audio-to-text features, voice-enabled search, voice-enabled navigation and/or voice-enabled commands and other voice-enabled features, or application features that seek to receive, and/or store, an audio file from a microphone input. In these and other similar scenarios, when the application 804 encounters a command to activate a voice-enabled feature, the application 804 interfaces with the microphone hardware API of the remote device 114 to receive an audio input.

In many cases, the remote devices 104 are located in the datacenters 112 and providing microphone input from the environment of a datacenter can be impractical, inefficient, or otherwise difficult to implement. In these and similar scenarios, the users 102, who are interested in testing and developing the interactions of their applications 804 with the microphone of a remote device 114, can utilize the audio injection feature of the RTS 100, where the RTS 100 can receive an audio file 806 and inject it to the remote device 114 as audio input in response to a feature of the application 804 requesting audio input. A remote device 114 can be connected to the RTS network 802 via a host 118. The implementation of the host 118 can depend on the hardware and software type of the remote device 114 to which the host 118 is connected. For example, the host 118 can be a laptop or desktop machine running Microsoft Window®, Unix®, Macintosh® operating system (Mac OS) or any other hardware/software compatible with the remote device 114. The remote device 114 can be connected to a host 118 via a wired and/or a wireless connection, such as universal serial bus (USB), Ethernet, Wifi, Bluetooth or other types of connections. The RTS 100 can configure a virtual microphone on the host 118 to act as an external audio input device connected to the remote device 114. The user 102 can provide an audio file 806 to the RTS 100, which can be uploaded to the host 118. The audio file 806 can be prerecorded audio, or it can be a live audio stream provided by the user 102 and/or the user's local machine 104, for example via an RTS application running locally or remotely and accessed via a browser running on the local machine 104. The user 102 can also access the RTS network 802 and upload the audio file 806 via other methods, such as using an RTS desktop application.

In some embodiments, to enable the audio injection feature, the host 118 can turn on a wireless communication network with nearby devices and advertise itself as an audio input device. For example, the host 118, can turn on Bluetooth and advertise itself as a Bluetooth headset or microphone device. The remote device 114 can connect to the host 118 via the wireless communication network and interact with the virtual microphone on the host 118, as it would with a Bluetooth headset. Once the host 118 is configured as an audio input device to the remote device 114, the host 118 can replay an audio file or patch through a live stream audio file to the remote device 114. The operating system of the remote device 114 can route the received audio to the application 804.

Figure 9:
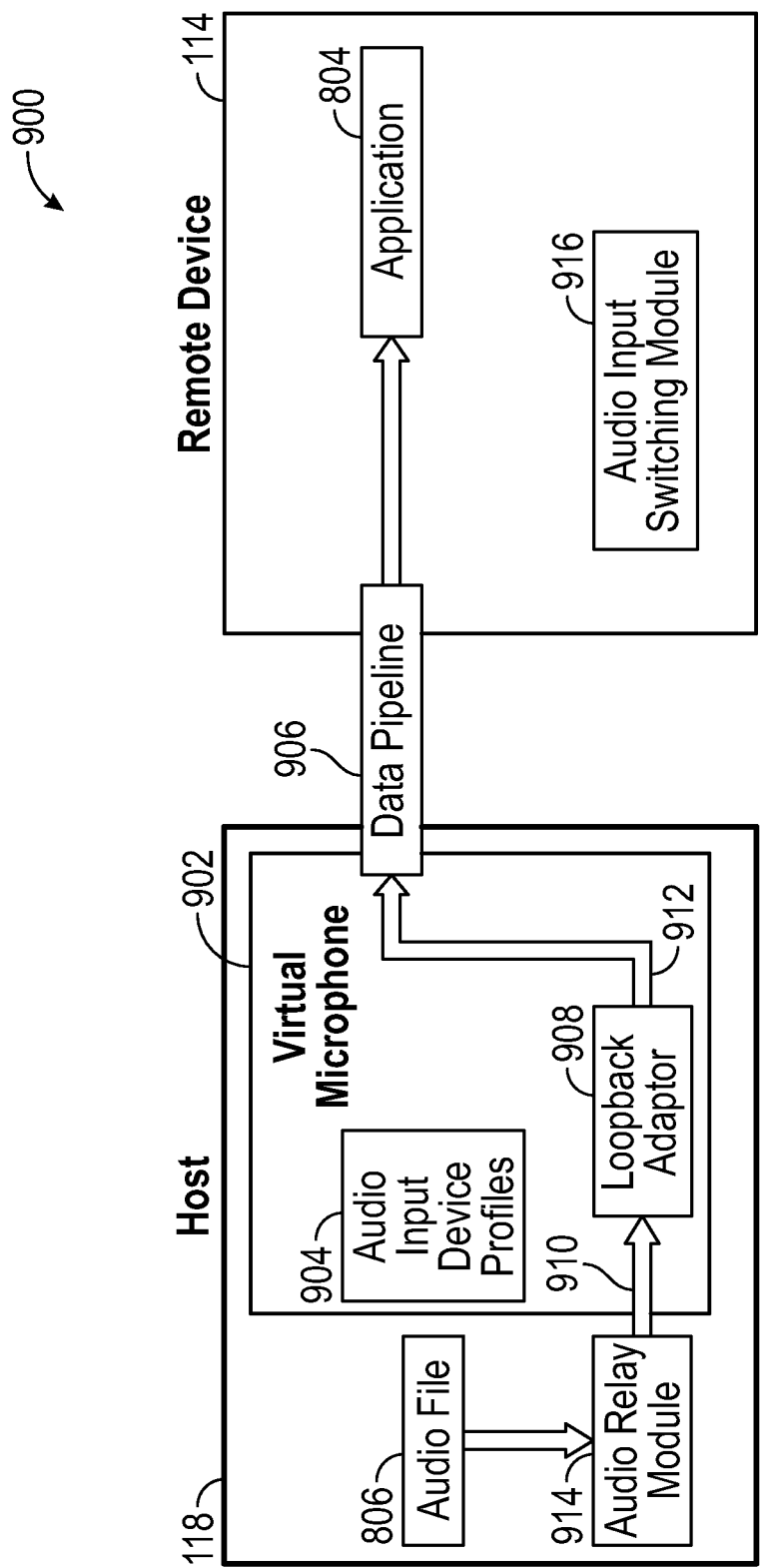
FIG. 9 illustrates a block diagram of the operations of a host device and a remote device in order to enable the audio injection feature of the embodiment of FIG. 1.

FIG. 9 illustrates a block diagram 900 of the operations of the host device 118 and the remote device 114 in order to enable the audio injection feature of RTS 100. The host 118 can be configured to generate a virtual microphone 902 by uploading audio input device profiles 904. The audio input device profiles 904 can include a set of computer instructions that allow the host 118, to become an audio input device to an external device, such as the remote device 114. The audio input device profiles 904 can include instructions for the host 118 to become an audio input device using a selected communication protocol. In some embodiments, the audio input device profiles 904 are the same profiles used by other audio input devices, such as microphones or headsets, over wired or wireless communication protocols. The audio input device profiles 904 can depend on the type of communication protocol used to connect the host 118 with the remote device 114. For example, when Bluetooth communication is used, the audio input device profiles can be Advanced Audio Distribution Profile (A2DP) and Hands-Free Profile (HFP). These and similar profiles allow the host 118 to register as a Bluetooth headset. Other Bluetooth profiles and/or other communication protocols can also be used to generate the virtual microphone 902 and establish the host 118 as an external audio input device to the remote device 114.

The audio input device profiles 904 allow the host 118 to generate a data pipeline 906 between the host 118 and the remote device 114. When Bluetooth profiles are used, the data pipeline 906 is a Bluetooth communication channel between the host 118 and the remote device 114. Executing the audio input device profiles 904 establishes a data pipeline 906 between the host 118 and the remote device 114 and generates the virtual microphone 902, effectively converting the host 118 into an external audio input device for the remote device 114. The virtual microphone 902 can receive its input from the microphone of the host 118. The host 118 is in a similar environment as the remote device 114 and can be located in the same datacenter 112 as the remote device 114, making it difficult or impractical to replay an audio file through the physical microphone of the host 118.

In some embodiments, the virtual microphone 902 can include a loopback adapter 908. The loopback adapter 908 is an audio server, which can capture a playback or replay of an audio file, or a live stream from a livestream audio file and can patch the audio to the remote device 114 through the data pipeline 906. The loopback adapter 908 can include an input channel 910 and an output channel 912. The input channel 910 can link with an audio relay module 914. The audio relay module 914 can receive an audio file 806 and replay it to the loopback adaptor input channel 910. In scenarios where the audio file 806 is a live audio stream broadcasted from the user 102, the audio relay module 914 patches the live audio stream audio file 806 directly to the input channel 910. The output channel 912 of the loopback adaptor 908 links with the data pipeline 906. In this manner, the virtual microphone 902 can replay a prerecorded audio file 806 or patch through a livestream audio file 806, via the loopback adaptor to the data pipeline 906, as opposed to having to obtain its input from the physical microphone of the host 118.

When the host 118 generates the virtual microphone 902 and establishes the data pipeline 906 with the remote device 114, the operating system of the remote device 114 treats the host 118 like any other external audio input device and routes any received audio to the requesting application 804. Some operating systems may not automatically switch the audio input of an application to the data pipeline 906. For example, in some devices, the operating system can be configured to track different audio inputs for different applications, regardless of any specified master audio input device of the operating system. In some embodiments, an audio input switching module 916 can be installed on the remote device 114. The audio input switching module 916 can switch the audio input of the application 804 from any default or previously configured input source to the data pipeline 906.

Figure 10:
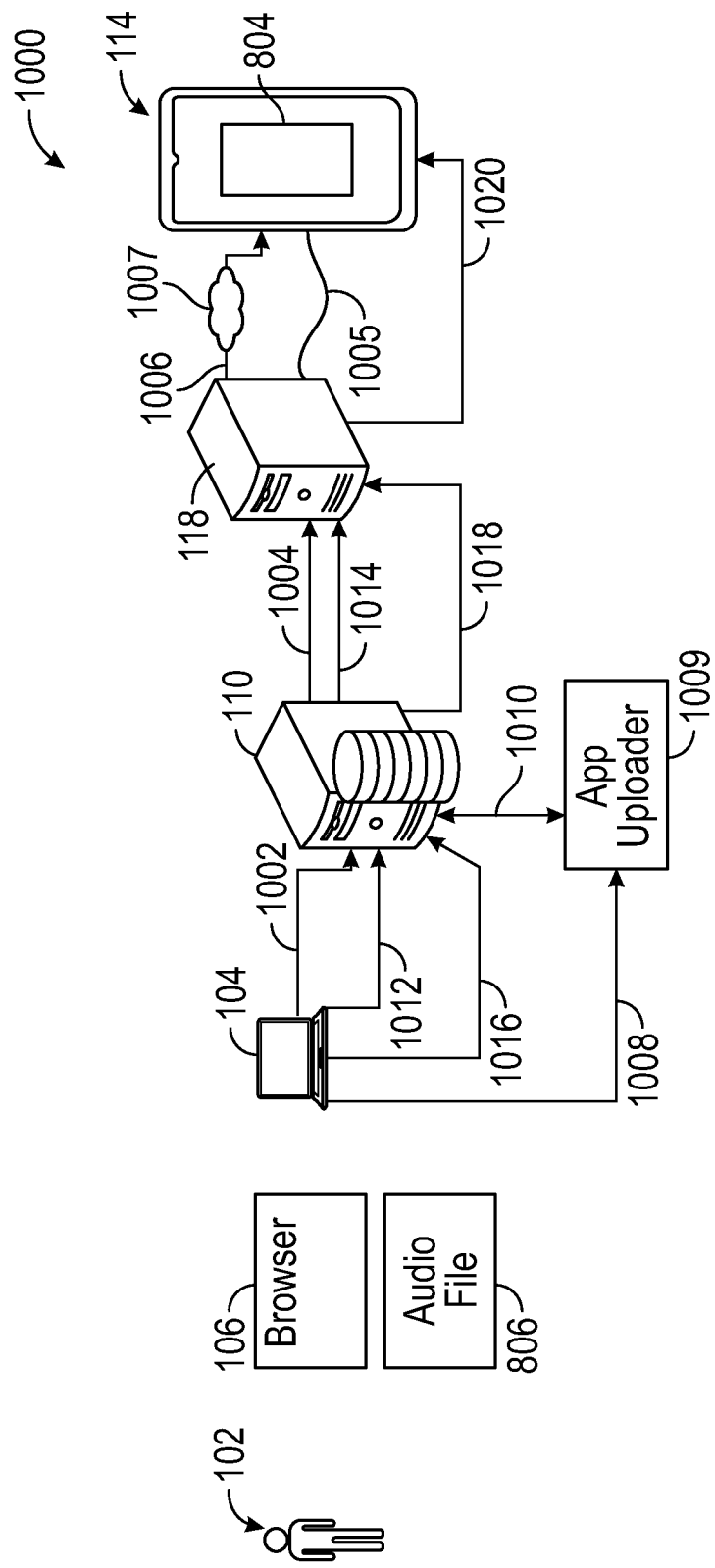
FIG. 10 illustrates a block diagram of data flow in the infrastructure of the embodiment of FIG. 1 to enable audio injection feature.

FIG. 10 illustrates a block diagram 1000 of data flow in the infrastructure of the RTS 100 to enable audio injection feature. At step 1002, the user 102 can use the browser 106, running on the local machine 104 to send a request to start a test session with the remote device 114, wherein the session is enabled with the audio injection feature. The user 102 may select to enable a test session with audio injection feature when the user is interested in testing the behavior and response of an application 804 to audio inputs received from a device microphone. Once the session is enabled, the application 804 runs on the remote device 114 and a video stream of the display of the remote device 114 is streamed to the local machine 104, and received, for example via the browser 106, and the user 102 can inspect the response of the application 804, to an audio input, on the user's local machine 104. The request at step 1002 can be received at the server 110, where it is determined that the user 102 has selected a session with the audio injection feature enabled. At step 1004, the server 110 sends a request to start an audio-injection-enabled session to the host 118. At step 1006, the host 118 can set up a connection with the remote device 114, via which the host 118 can become an external audio input device to the remote device 114, in addition to or among other functionality that the host 118 may provide to the remote device 114 or vice-versa as part of the operations of the RTS 100 to enable and conduct a session.

The host 118 can be coupled to a remote device 114 via one or both of a wired connection 1005 and a wireless connection 1007. For example, the wired connection 1005 can be a USB connection and the wireless connection 1007 can be a Bluetooth connection. The host 118 can become an external audio input device via either of the connections 1005, 1007. In some embodiments, the wireless connection 1007 is established, as part of the host 118 becoming an audio input device to the remote device 114. For example, the host 118 can generate a virtual Bluetooth headset to connect to the remote device 114, simulating itself as a Bluetooth headset, where the data pipeline 906 is a Bluetooth connection established via the wireless connection 1007. As described earlier, the audio injection feature is then enabled through the data pipeline 906. When Bluetooth is used, the step 1006 can include subroutines, such as enabling Bluetooth adaptors on both the host 118 and the remote device 114 and enabling Bluetooth pairing functionality and/or placing one of the host 118 or remote device 114 in Bluetooth search mode. In some cases, the host 118 is placed in search mode and the remote device 114 is placed in pairing mode. The host 118 can query and receive a Bluetooth media access control (MAC) address from the remote device 114, via which the host 118 can pair with the remote device 114. A Bluetooth address or Bluetooth MAC address is a number uniquely identifying a Bluetooth device. The providing of the Bluetooth MAC address is used when several remote devices 114 may be in the vicinity of the host 118. The Bluetooth MAC address enables the host 118 to determine to which remote device 114 it should pair.

At step 1008, the user 102 can upload an audio file 806 to an app uploader 1009. The app uploader 1009 is a component of the RTS 100, which can receive a file, for example a media file, or in this case an audio file and upload the file to the RTS 100, for example to server 110. As described earlier, the audio file 806 can be a stream or a continuously updating audio file received from the user 102, for example, when the user is using the microphone of the local machine 104 to test an audio input feature of the application 804, or the audio file 806 can be a prerecorded audio file, which the user 102 can request the RTS 100 to inject, in order to test an audio feature of the application 804. In case of a live stream, the app uploader 1009 can patch an incoming audio stream in the form of a broadcast to the RTS 100, including for example to the server 110. At step 1010, the app uploader 1009 provides the audio file 806 to the server 110.

At step 1012, the user 102 can provide an "inject audio" command to the RTS 100, which can be received by the server 110. At step 1014, the server 110 can provide the audio file 806 to the host 118. At step 1016, the user can provide a "play audio" command to the RTS 100, which can be received by the server 110. For example, the user may be testing non-input-audio functionality of the application 804 until the application 804 reaches an execution state, where an audio input is requested. The user 102 can trigger the step 1016 to provide an indication to the RTS 100, that the audio file 806 should be provided to the application 804, as an audio input. At step 1018, the server 110 provides a "play audio" command to the host 118. At this stage, the host 118 has previously established itself as an external audio input device to the remote device 114.

At step 1020, the host 118 outputs the audio file 806 to the remote device 114. The operating system of the remote device 114 treats the received audio file 806, as it would any other audio input from an external audio input device and routes the audio file 806 to the application 806. The application 806 receives the audio input and acts upon it. The RTS 100 streams a video feed of the display of the response of the application 804 to the browser 106, whereby the user 102 can inspect the behavior and response of the application 804 to the audio input.

Audio Injection Methods

FIG. 11 illustrate a flowchart of a method 1100 of enabling the RTS 100 with an audio injection feature. The method starts at step 1102. At step 1104, a request to start an audio-injection featured session is received. At step 1106, the RTS 100 configures a host 118 to be an external audio input device to a remote device 114. For example, a host 118 can be configured as an external audio input device over a wireless connection. In this manner, the host 118 is configured to simulate an external audio input device, such as a Bluetooth headset. At step 1108, the RTS 100 can receive an audio file 806. The audio file 806 can be a prerecorded audio file or a streaming audio file. The RTS 100 provides the audio file 806 to the host 118. At step 1110, upon receiving an instruction to playback the audio file, the host 118 plays the audio file 806 to the remote device 114 by replaying the audio file through a data pipeline established between the remote device 114 and the host 118, or by patching a livestream audio file through the data pipeline. The operating system of the remote device 114 treats the received audio as input from an external audio input device and routes the received audio to the application 804. The method ends at step 1112.

FIG. 12 illustrates a flowchart of a method 1200 of configuring the host 118 as an audio input device and playing an audio file when an audio injection feature of the RTS 100 is used. The method starts at step 1202. At step 1204, a virtual microphone is generated on the host 118. The virtual microphone can be generated by uploading and executing a set of audio input device profiles to the host 118. The virtual microphone establishes a connection, including a data pipeline, between the host 118 and the remote device 114. At this stage, the operating system of the remote device 114 treats the host 118 as an external audio input device of the remote device 114. Consequently, the host 118 can provide audio to the remote device 114 via the data pipeline.

At step 1206, the host 118 generates a loopback adaptor. The loopback adaptor enables the virtual microphone to use an audio file as its input source, as opposed to the internal microphone of the host 118. The loopback adaptor has an input channel and an output channel. A playback or stream-through play of the audio file 806 can link to the input channel of the loopback adaptor. The output channel of the loopback adaptor is linked with and provided to the data pipeline of the connection between the host 118 and the remote device 114. At step 1208, the audio file is played back or streamed through the loopback adaptor and the remote device listens to the playing of the audio file through the data pipeline. The operating system of the remote device 114 continuously routes the audio received through the data pipeline to the application 804. The method ends at step 1210.

EXAMPLES

It will be appreciated that the present disclosure may include any one and up to all of the following examples.

Example 1: A method comprising: establishing a communication network between a browser and a remote device, through a host machine coupled between the browser and the remote device; configuring the host machine to become an audio input device of the remote device, via a data pipeline; receiving, at the host machine, an audio file from the browser; replaying the audio file on the host machine; outputting the replayed audio file to the remote device via the data pipeline; and streaming a video feed of a display response of the remote device to the browser via the communication network.

Example 2: The method of Example 1, further comprising: generating a virtual microphone on the host machine comprising a loopback adaptor having an input channel and an output channel, wherein the input channel links to an output of the replayed audio file on the host machine and the output channel links to the data pipeline.

Example 3: The method of some or all of Examples 1 and 2, wherein configuring the host machine as an audio input device comprises establishing a wireless connection between the host machine and the remote device, wherein the data pipeline comprises a communication channel over the wireless connection.

Example 4: The method of some or all of Examples 1-3, wherein configuring the host machine as an audio input device comprises establishing a wireless connection between the host machine and the remote device, wherein the data pipeline comprises a communication channel over the wireless connection and the wireless connection comprises a Bluetooth connection.

Example 5: The method of some or all of Examples 1~4 further comprising: generating an audio switching application on the remote device configured to switch an audio input of the remote device to accepting audio inputs via the data pipeline.

Example 6: The method of some or all of Examples 1-5 further comprising: executing an application on the remote device, wherein the application comprises features requesting audio input from a microphone of the remote device; switching the audio input of the remote device to a virtual microphone of the host machine; and the remote device providing the audio file received via the data pipeline to the application.

Example 7: The method of some or all of Examples 1-6, wherein receiving the audio file comprises receiving a live stream of audio from the browser.

Example 8: The method of some or all of Examples 1-7, further comprising: installing one or more wireless communication profiles on the host machine, wherein the profiles configure the host machine to mimic operations of a wireless microphone paired with the remote device.

Example 9: A non-transitory computer storage that stores executable program instructions that, when executed by one or more computing devices, configure the one or more computing devices to perform operations comprising: establishing a communication network between a browser and a remote device, through a host machine coupled between the browser and the remote device; configuring the host machine to become an audio input device of the remote device, via a data pipeline; receiving, at the host machine, an audio file from the browser; replaying the audio file on the host machine; outputting the replayed audio file to the remote device via the data pipeline; and streaming a video feed of a display response of the remote device to the browser via the communication network.

Example 10: The non-transitory computer storage of Example 9, wherein the operations further comprise: generating a virtual microphone on the host machine comprising a loopback adaptor having an input channel and an output channel, wherein the input channel links to an output of the replayed audio file on the host machine and the output channel links to the data pipeline.

Example 11: The non-transitory computer storage of some or all of Examples 9 and 10, wherein configuring the host machine as an audio input device comprises establishing a wireless connection between the host machine and the remote device, wherein the data pipeline comprises a communication channel over the wireless connection.

Example 12: The non-transitory computer storage of some or all of Examples 9-11, wherein configuring the host machine as an audio input device comprises establishing a wireless connection between the host machine and the remote device, wherein the data pipeline comprises a communication channel over the wireless connection and the wireless connection comprises a Bluetooth connection.

Example 13: The non-transitory computer storage of some or all of Examples 9-12, wherein the operations further comprise: generating an audio switching application on the remote device configured to switch an audio input of the remote device to accepting audio inputs via the data pipeline.

Example 14: The non-transitory computer storage of some or all of Examples 9-13, wherein the operations further comprise: executing an application on the remote device, wherein the application comprises features requesting audio input from a microphone of the remote device; switching the audio input of the remote device to a virtual microphone of the host machine; and the remote device providing the audio file received via the data pipeline to the application.

Example 15: The non-transitory computer storage of some or all of Examples 9-14, wherein receiving the audio file comprises receiving a live stream of audio from the browser.

Example 16: The non-transitory computer storage of some or all of Examples 9-15, wherein the operations further comprise: installing one or more wireless communication profiles on the host machine, wherein the profiles configure the host machine to mimic operations of a wireless microphone paired with the remote device.

Example 17: A system comprising a processor, the processor configured to perform operations comprising: establishing a communication network between a browser and a remote device, through a host machine coupled between the browser and the remote device; configuring the host machine to become an audio input device of the remote device, via a data pipeline; receiving, at the host machine, an audio file from the browser; replaying the audio file on the host machine; outputting the replayed audio file to the remote device via the data pipeline; and streaming a video feed of a display response of the remote device to the browser via the communication network.

Example 18: The system of Example 17, wherein the operations further comprise: generating a virtual microphone on the host machine comprising a loopback adaptor having an input channel and an output channel, wherein the input channel links to an output of the replayed audio file on the host machine and the output channel links to the data pipeline.

Example 19: The system of some or all of Examples 17 and 18, wherein configuring the host machine as an audio input device comprises establishing a wireless connection between the host machine and the remote device, wherein the data pipeline comprises a communication channel over the wireless connection.

Example 20: The system of some or all of Examples 17-19, wherein the operations further comprise: executing an application on the remote device, wherein the application comprises features requesting audio input from a microphone of the remote device; switching the audio input of the remote device to a virtual microphone of the host machine; and the remote device providing the audio file received via the data pipeline to the application.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method comprising:
in a communication network between a browser and a remote device, through a host machine coupled to the remote device, via a first connection, and an operating system of the remote device having an audio input corresponding to a microphone of the remote device,
pairing the host machine to the remote device via a secondary connection, wherein the host machine is paired as an external audio input of the remote device, via the secondary connection, wherein the audio input of the remote device is switchable between the host machine and the microphone of the remote device, wherein when the audio input of the remote device is switched to the host machine, the operating system of the remote device is configured to receive audio from the host machine;
receiving, at the host machine, an audio file from the browser;
relaying the audio file from the host machine to the remote device via the secondary connection;
generating a virtual microphone on the host machine wherein the virtual microphone is configured to receive the audio file, and output the audio file to the remote device via the secondary connection; and
generating an audio switching application on the remote device configured to switch the audio input of the remote device between the host machine and the microphone of the remote device.

2. The method of claim 1, wherein the host machine comprises a host machine audio input corresponding to an internal microphone of the host machine, and the host machine is configured to switch the host machine audio input from the internal microphone of the host machine to the audio file.

3. The method of claim 1, wherein the secondary connection comprises a wireless connection between the host machine and the remote device.

4. The method of claim 1, wherein the secondary connection comprises a wireless connection between the host machine and the remote device, and the wireless connection comprises a Bluetooth connection.

5. The method of claim 1, wherein the secondary connection is a Bluetooth connection, and pairing the host machine to the remote device further comprises:
simulating the host machine as an external Bluetooth device;
enabling Bluetooth pairing on the remote device and/or the host machine;
placing the remote device and/or the host machine in Bluetooth search mode;
receiving a Bluetooth media access control address; and
pairing the host machine to the remote device, based on the received Bluetooth media access control address.

6. The method of claim 1 further comprising:
executing an application on the remote device, wherein the application comprises features requesting audio from the remote device;
switching the audio input of the remote device to the host machine; and
the remote device, providing the audio file received via the secondary connection, to the application.

7. The method of claim 6, wherein the features comprise one or more of audio-to-text features, voice-enabled searching, voice-enabled navigation, and voice-enabled commands.

8. The method of claim 1, wherein the communication network between the browser and the remote device comprises a server, wherein the method further comprises:
when an application installed on the remote device reaches an execution state on the remote device requesting an application audio input from the remote device,
receiving, at the server, an audio injection command;
the server, issuing the audio injection command to the host machine; and
the host machine, relaying the audio file to the application installed on the remote device via the secondary connection.

9. The method of claim 1, wherein the audio file comprises an audio stream file, broadcasted from the browser.

10. The method of claim 1, further comprising:
installing one or more wireless communication profiles on the host machine, wherein the profiles configure the host machine to mimic operations of a wireless microphone paired with the remote device.

11. A non-transitory computer storage medium that stores executable program instructions that, when executed by one or more computing devices, configure the one or more computing devices to perform operations comprising:
in a communication network between a browser and a remote device, through a host machine coupled to the remote device, via a first connection, and an operating system of the remote device having an audio input corresponding to a microphone of the remote device, pairing the host machine to the remote device via a secondary connection, wherein the host machine is paired as an external audio input of the remote device, via the secondary connection, wherein the audio input of the remote device is switchable between the host machine and the microphone of the remote device, wherein when the audio input of the remote device is switched to the host machine, the operating system of the remote device is configured to receive audio from the host machine;

receiving, at the host machine, an audio file from the browser;

relaying the audio file from the host machine to the remote device via the secondary connection;

generating a virtual microphone on the host machine wherein the virtual microphone is configured to receive the audio file, and output the audio file to the remote device via the secondary connection; and generating an audio switching application on the remote device configured to switch the audio input of the remote device between the host machine and the microphone of the remote device.

12. The non-transitory computer storage medium of claim 11, wherein the host machine comprises a host machine audio input corresponding to an internal microphone of the host machine, and the host machine is configured to switch the host machine audio input from the internal microphone of the host machine to the audio file.

13. The non-transitory computer storage medium of claim 11, wherein the secondary connection comprises a wireless connection between the host machine and the remote device.

14. The non-transitory computer storage medium of claim 11, wherein the secondary connection is a Bluetooth connection, and pairing the host machine to the remote device further comprises:

simulating the host machine as an external Bluetooth device;

enabling Bluetooth pairing on the remote device and/or the host machine;

placing the remote device and/or the host machine in Bluetooth search mode;

receiving a Bluetooth media access control address; and pairing the host machine to the remote device, based on the received Bluetooth media access control address.

15. The non-transitory computer storage medium of claim 11, wherein the operations further comprise:

executing an application on the remote device, wherein the application comprises features requesting audio from the remote device;

switching the audio input of the remote device to the host machine; and the remote device, providing the audio file received via the secondary connection, to the application.

16. The non-transitory computer storage medium of claim 11, wherein the communication network between the browser and the remote device comprises a server, wherein the operations further comprise:

when an application installed on the remote device reaches an execution state on the remote device requesting an application audio input from the remote device, receiving, at the server, an audio injection command;

the server, issuing the audio injection command to the host machine; and the host machine, relaying the audio file to the application installed on the remote device via the secondary connection.

17. A system comprising one or more processors, wherein the one or more processors are configured to perform operations comprising:

in a communication network between a browser and a remote device, through a host machine coupled to the remote device, via a first connection, and an operating system of the remote device having an audio input corresponding to a microphone of the remote device, pairing the host machine to the remote device via a secondary connection, wherein the host machine is paired as an external audio input of the remote device, via the secondary connection, wherein the audio input of the remote device is switchable between the host machine and the microphone of the remote device, wherein when the audio input of the remote device is switched to the host machine, the operating system of the remote device is configured to receive audio from the host machine;

receiving, at the host machine, an audio file from the browser;

relaying the audio file from the host machine to the remote device via the secondary connection;

generating a virtual microphone on the host machine wherein the virtual microphone is configured to receive the audio file, and output the audio file to the remote device via the secondary connection; and generating an audio switching application on the remote device configured to switch the audio input of the remote device between the host machine and the microphone of the remote device.

18. The system of claim 17, wherein the host machine comprises a host machine audio input corresponding to an internal microphone of the host machine, and the host machine is configured to switch the host machine audio input from the internal microphone of the host machine to the audio file.

19. The system of claim 17, wherein the secondary connection comprises a wireless connection between the host machine and the remote device.

20. The system of claim 17, wherein the operations further comprise:

executing an application on the remote device, wherein the application comprises features requesting audio from the remote device;

switching the audio input of the remote device to the host machine; and the remote device, providing the audio file received via the secondary connection, to the application.

* * * * *